United States Patent
Shamoto et al.

(10) Patent No.: US 11,773,504 B2
(45) Date of Patent: Oct. 3, 2023

(54) PLATING SUPPORT SYSTEM, PLATING SUPPORT DEVICE, AND RECORDING MEDIUM

(71) Applicant: EBARA CORPORATION, Tokyo (JP)

(72) Inventors: Mitsuhiro Shamoto, Tokyo (JP); Masashi Shimoyama, Tokyo (JP); Tsutomu Nakada, Tokyo (JP); Hideharu Aoyama, Tokyo (JP); Masayuki Fujiki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 28 days.

(21) Appl. No.: 17/149,691

(22) Filed: Jan. 14, 2021

(65) Prior Publication Data
US 2021/0222315 A1 Jul. 22, 2021

(30) Foreign Application Priority Data

Jan. 17, 2020 (JP) .................. 2020-005826

(51) Int. Cl.
*C25D 21/12* (2006.01)
*C25D 17/00* (2006.01)
(Continued)

(52) U.S. Cl.
CPC ............. *C25D 21/12* (2013.01); *C25D 7/123* (2013.01); *C25D 17/001* (2013.01); *G06F 30/27* (2020.01); *G06F 2111/10* (2020.01)

(58) Field of Classification Search
CPC ................. C25D 7/12–123; C25D 17/001; C25D 21/12; H01L 21/2885; H01L 21/76873
See application file for complete search history.

(56) References Cited

U.S. PATENT DOCUMENTS

| 8,627,243 B1* | 1/2014 | Lin ............... H01L 21/7684 702/182 |
| 2003/0057099 A1* | 3/2003 | Guldi ............... C25D 17/001 205/291 |

(Continued)

FOREIGN PATENT DOCUMENTS

| JP | 2001152397 | 6/2001 |
| JP | 2005029863 | 2/2005 |

(Continued)

*Primary Examiner* — Hosung Chung
(74) *Attorney, Agent, or Firm* — JCIPRNET

(57) ABSTRACT

A plating support system is provided and includes a simulator that predicts an in-plane uniformity value of a plating film formed on a substrate based on assumed conditions for an electroplating treatment of the substrate; a numerical analysis data storage unit that stores numerical analysis data in which each assumed condition is associated with the in-plane uniformity value for plural assumed conditions; a regression analysis unit that estimates a model that the in-plane uniformity value is an objective variable and variables of assumed conditions are explanatory variables by regression analysis based on the numerical analysis data; and an implement condition search unit that uses the estimated model to search for implement conditions that are recommended values of the assumed conditions related to the in-plane uniformity of the plating film formed in the electroplating treatment of the substrate to be plated.

34 Claims, 26 Drawing Sheets

(51) Int. Cl.
*G06F 30/27* (2020.01)
*C25D 7/12* (2006.01)
*G06F 111/10* (2020.01)

(56) References Cited

U.S. PATENT DOCUMENTS

| | | | | |
|---|---|---|---|---|
| 2003/0129774 | A1* | 7/2003 | Christian | H01L 21/76843 |
| | | | | 257/E21.585 |
| 2004/0211662 | A1* | 10/2004 | Chadda | H01L 21/2885 |
| | | | | 257/E21.175 |
| 2005/0132306 | A1* | 6/2005 | Smith | G06F 30/39 |
| | | | | 716/114 |
| 2005/0183959 | A1* | 8/2005 | Wilson | C25D 7/123 |
| | | | | 205/157 |
| 2016/0145760 | A1* | 5/2016 | Fujikata | C25D 17/10 |
| | | | | 205/128 |
| 2018/0274116 | A1* | 9/2018 | Shamoto | C25D 7/123 |
| 2021/0395913 | A1* | 12/2021 | Banik, II | C25D 17/02 |

FOREIGN PATENT DOCUMENTS

| | | |
|---|---|---|
| JP | 2016079504 | 5/2016 |
| JP | 2016098399 | 5/2016 |

* cited by examiner

| assumed condition | | | | |
|---|---|---|---|---|
| seed layer thickness Wa | aperture ratio Wb | plating time Pa | target thickness of plating film Pb | current density Pc |
| Wa1 | Wb1 | Pa1 | Pb1 | Pc1 |
| Wa2 | Wb1 | Pa1 | Pb1 | Pc1 |
| ... | ... | ... | ... | ... |
| WaN | WbN | PaN | PbN | PcN |

| assumed condition | | | in-plane uniformity value U |
|---|---|---|---|
| plating solution type Pd | anode mask size Ha | intermediate mask size Hb | |
| strong acid | Ha1 | Hb1 | U1 |
| strong acid | Ha1 | Hb1 | U2 |
| ... | ... | ... | ... |
| weak acid | HaN | HbN | UM |

FIG. 5

| input value | | |
|---|---|---|
| wafer specifications | | |
| seed layer thickness | Wa_in | nm |
| aperture ratio | Wb_in | % |
| process condition | | |
| plating time | Pa_in | second |
| target thickness of plating film | Pb_in | $\mu$m |
| plating solution type | ☐ strong acid  ☑ medium acid  ☐ weak acid | |

FIG. 6

| candidate condition | | | | |
|---|---|---|---|---|
| seed layer thickness Wa | aperture ratio Wb | plating time Pa | target thickness of plating film Pb | current density Pc |
| Wa_in | Wb_in | Pa_in | Pb_in | Pc_min |
| ... | ... | ... | ... | ... |
| Wa_in | Wb_in | Pa_in | Pb_in | Pc_s |
| ... | ... | ... | ... | ... |
| Wa_in | Wb_in | Pa_in | Pb_in | Pc_max | continue

| candidate condition | | | |
|---|---|---|---|
| plating solution type Pd | anode mask size Ha | intermediate mask size Hb | in-plane uniformity value u |
| intermediate acid | Ha_min | Hb_min | u1 |
| ... | ... | ... | ... |
| intermediate acid | Ha_s | Hb_s | uS |
| ... | ... | ... | ... |
| intermediate acid | Ha_max | Hb_max | uR |

FIG. 7

(a)
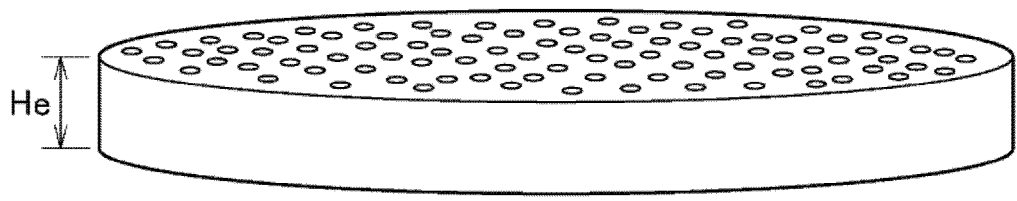
(b)
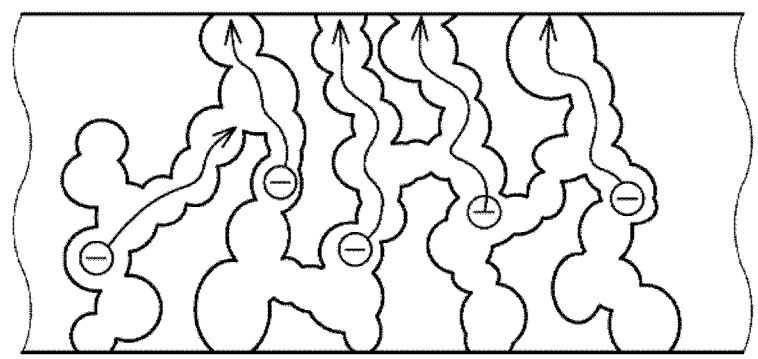
(c)
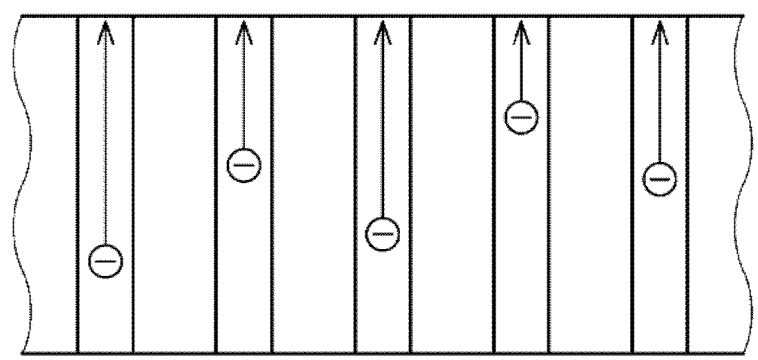
FIG. 26

PLATING SUPPORT SYSTEM, PLATING SUPPORT DEVICE, AND RECORDING MEDIUM

CROSS REFERENCE TO RELATED APPLICATIONS

This application claims the priority benefit of Japanese Patent Application No. 2020-005826, filed on Jan. 17, 2020. The entirety of the above-mentioned patent application is hereby incorporated by reference herein and made a part of this specification.

BACKGROUND

Technical Field

The disclosure relates to a plating support system, a plating support device, and a plating support program.

Description of Related Art

As a method of forming a wiring or a bump (protruding electrode) on a circular substrate such as a semiconductor wafer, an electroplating method which is relatively inexpensive and has a short processing time is widely used. A plating device used in the electroplating method includes a substrate holder that holds a substrate whose surface is exposed and an anode that is arranged to face the substrate. The substrate is connected to a power source with the substrate holder therebetween and the anode is connected to the power source with the anode holder that holds the anode therebetween. During a plating treatment, the substrate holder is immersed in a plating solution, and a current is applied between the anode and the substrate, which are also immersed in the plating solution, to deposit a conductive material on the surface of the substrate.

Generally, electrical contacts for passing electricity through the substrate are arranged in a peripheral part of the substrate. Therefore, distances to the electrical contacts differ between the center part of the substrate and the peripheral part of the substrate, and a potential difference occurs between the center part of the substrate and the peripheral part of the substrate according to the degree of the electrical resistance of a seed layer. Therefore, a plating layer becomes thin in the center part of the substrate and a plating layer in the peripheral part of the substrate becomes thick. This phenomenon is called a "terminal effect."

The uniformity of the thickness of a plating film on the surface of the substrate is called "in-plane uniformity." In the related art, the electric field formed between the anode and the substrate has been controlled in order to reduce the influence of the terminal effect and obtain a plating film having in-plane uniformity. For example, a substrate holder including a blocking component that blocks an electric field with respect to a peripheral part of a substrate (Patent Document 1: Japanese Patent Application Laid-Open No. 2016-079504) has been disclosed. Patent Document 2 (Japanese Patent Application Laid-Open No. 2016-098399) and Patent Document 3 (Japanese Patent Application Laid-Open No. 2005-029863) disclose a technique for improving the in-plane uniformity of a plating film using an anode mask.

It is desirable to obtain a plating film having high in-plane uniformity on a substrate. However, it is not easy to select a suitable size of a blocking plate or an anode mask in order to obtain a plating film having high in-plane uniformity.

The same applies to other adjustable factors that are conditions when executing a plating treatment. For example, a distance between electrodes is also included in the implement conditions, but it is difficult to select a suitable distance between electrodes. In particular, when a plurality of variables as adjustable factors is adjusted, it is necessary to predict an effect resulting from combining them, which increases difficulty of adjustment. Here, Patent Document 4 (Japanese Patent Application Laid-Open No. 2001-152397) discloses a simulator technique for predicting an in-plane uniformity value of a plating film formed on a substrate based assumed conditions for an electroplating treatment of the substrate, but it is not realistic because a processing load for performing a simulation under all of the conditions is large.

SUMMARY

The disclosure provides production efficiency by simplifying determination of suitable implement conditions in order to obtain a plating film having high in-plane uniformity and facilitating a plating treatment operation.

According to one embodiment of the disclosure, a plating support system is provided. The plating support system includes a simulator that predicts an in-plane uniformity value of a plating film formed on a substrate based on assumed conditions for an electroplating treatment of the substrate; a storage unit that stores numerical analysis data in which the in-plane uniformity value predicted by the simulator is associated with values of the one or plural variables that specify each assumed condition for a plurality of assumed conditions; an analysis unit that estimates a model in which the in-plane uniformity value is used as an objective variable and the one or plural variables are used explanatory variables by regression analysis based on the numerical analysis data; and a search unit that uses the estimated model to search for implement conditions that are recommended values of the assumed conditions related to an in-plane uniformity of the plating film formed in the electroplating treatment of the substrate to be plated.

According to another embodiment of the disclosure, a plating support system is provided. The plating support system includes a simulator that predicts an in-plane uniformity value of a plating film formed on a substrate based on assumed conditions for an electroplating treatment of the substrate; a storage unit that stores numerical analysis data in which the in-plane uniformity value predicted by the simulator is associated with values of the one or plural variables that specify each assumed condition for a plurality of assumed conditions; a learning unit that generates a model in which the in-plane uniformity value is used an objective variable and the one or plural variables are used as explanatory variables by machine learning based on the numerical analysis data; and a search unit that uses the generated model to search for implement conditions that are recommended values of the assumed conditions related to an in-plane uniformity of the plating film formed in the electroplating treatment of the substrate to be plated.

According to still another embodiment of the disclosure, a non-transitory computer-readable recording medium that stores a plating support program is provided. The plating support program causes a computer to execute: a function of estimating a model in which an in-plane uniformity value is used as an objective variable and one or plural variables are used as explanatory variables by regression analysis based on numerical analysis data in which values of the one or plural variables that specify assumed conditions for an electroplating treatment of a substrate are associated with simulation results of the in-plane uniformity value of a plating film formed on the substrate using the assumed conditions; and a function of using the estimated model to search for implement conditions that are recommended values of the assumed conditions related to an in-plane uniformity of the plating film formed in the electroplating treatment of the substrate to be plated.

According to still another embodiment of the disclosure, non-transitory computer-readable recording medium that stores a plating support program is provided. The plating support program causes a computer to execute: a function of generating a model in which an in-plane uniformity value is used as an objective variable and one or plural variables are used as explanatory variables by machine learning based on numerical analysis data in which values of the one or plural variables that specify assumed conditions for an electroplating treatment of a substrate are associated with simulation results of the in-plane uniformity value of a plating film formed on the substrate using the assumed conditions; and a function of using the generated model to search for implement conditions that are recommended values of the assumed conditions related to an in-plane uniformity of the plating film formed in the electroplating treatment of the substrate to be plated.

According to still another embodiment of the disclosure, a plating support device is provided. The plating support device includes an analysis unit that estimates a model in which an in-plane uniformity value is used as an objective variable and one or plural variables are used as explanatory variables by regression analysis based on numerical analysis data in which values of the one or plural variables that specify assumed conditions for an electroplating treatment of a substrate are associated with simulation results of the in-plane uniformity value of a plating film formed on the substrate using the assumed conditions; and a search unit that uses the estimated model to search for implement conditions that are recommended values of the assumed conditions related to an in-plane uniformity of the plating film formed in the electroplating treatment of the substrate to be plated.

According to still another embodiment of the disclosure, a plating support device is provided. The plating support device includes a learning unit that generates a model in which an in-plane uniformity value is used as an objective variable and one or plural variables are used as explanatory variables by machine learning based on numerical analysis data in which values of the one or plural variables that specify assumed conditions for an electroplating treatment of a substrate are associated with simulation results of the in-plane uniformity value of a plating film formed on the substrate using the assumed conditions; and a search unit that uses the generated model to search for implement conditions that are recommended values of the assumed conditions related to an in-plane uniformity of the plating film formed in the electroplating treatment of the substrate to be plated.

According to the disclosure, it is possible to easily determine implement conditions for improving the in-plane uniformity obtained by a plating treatment.

BRIEF DESCRIPTION OF THE DRAWINGS

FIG. 5 is a structure diagram of numerical analysis data.

FIG. 6 is a diagram showing an example of an input screen.

FIG. 7 is a structure diagram of search data.

FIG. 26 has (a) part that is a perspective view of an ion conduction control body.

FIG. 26 has (b) part that is a cross-sectional view of an ion conduction control body of a porous component.

FIG. 26 has (c) that is a cross-sectional view of an ion conduction control body of a punching plate.

DESCRIPTION OF THE EMBODIMENTS

Figure 1:
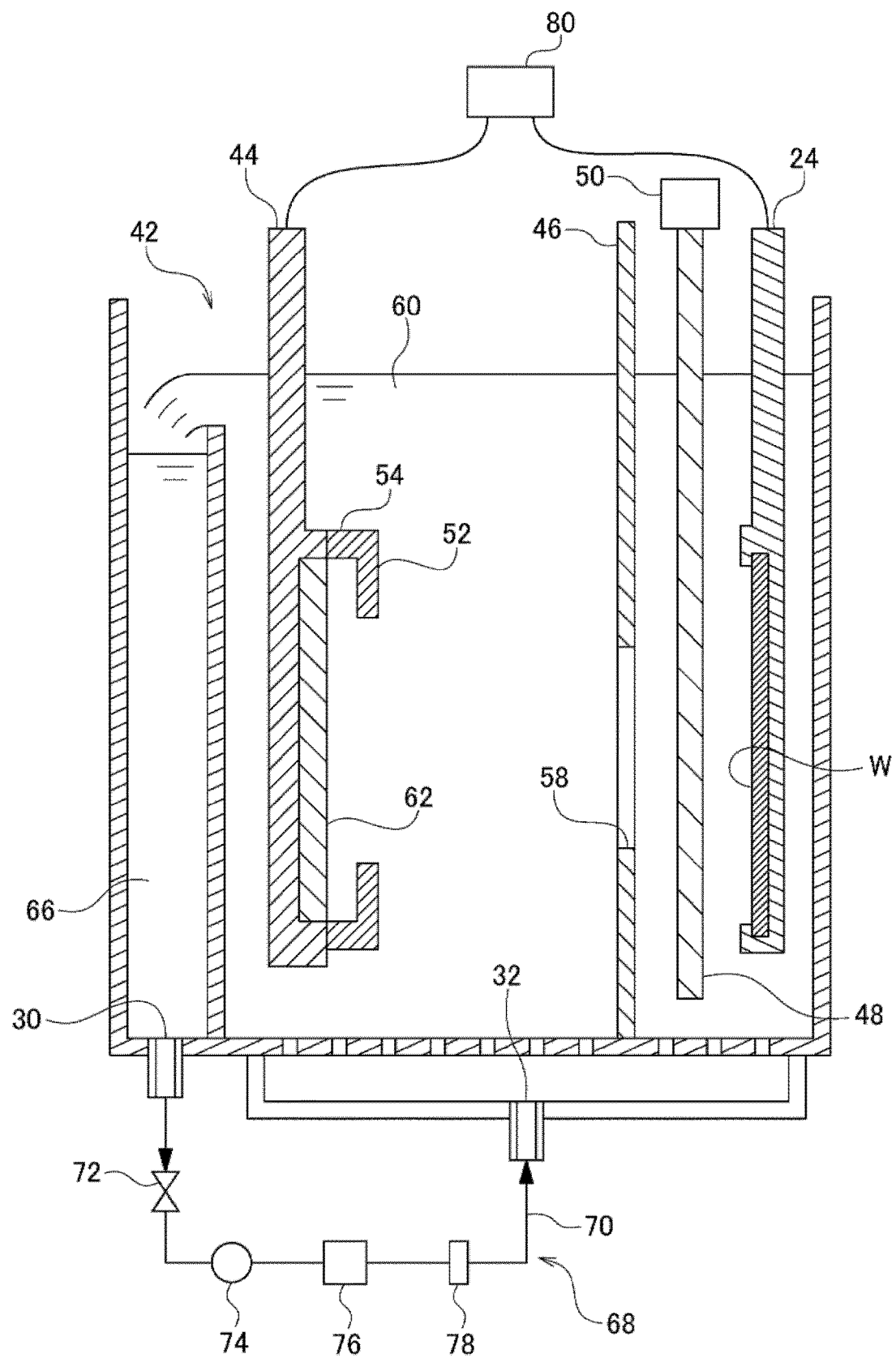
FIG. 1 is a diagram showing an overview of a plating tank.

The present embodiment will be described below with reference to the drawings. Here, in the following embodiments and modified examples thereof, substantially the same components will be denoted with the same reference numerals and descriptions thereof will be appropriately omitted.

First Embodiment

FIG. 1 is a diagram showing an overview of a plating tank 42. In the present embodiment, one surface of a substrate W is plated. In the plating tank 42, an anode holder 44, an intermediate mask 46, a paddle 48, and a substrate holder 24 are provided. An anode 62 is held in the anode holder 44. The anode 62 is connected to an external power source 80 via a wiring in the anode holder 44. The circular substrate W is held in the substrate holder 24. During a plating treatment, the anode 62 is arranged to face the surface of the substrate W.

The intermediate mask 46 is provided between the anode holder 44 and the substrate holder 24. An opening 58 is provided in the intermediate mask 46. When the size and the shape of the opening 58 are adjusted, an electric field between the intermediate mask 46 and the substrate W is adjusted. The intermediate mask 46 may be adjusted by providing a function for varying the size or shape of the opening 58, or may be replaced with an intermediate mask having openings having different sizes or different shapes. The paddle 48 for agitating a plating solution 60 near the surface of the substrate W is provided between the anode holder 44 and the substrate holder 24. The paddle 48 is, for example, a bar-like member, and is provided in the plating tank 42 so that it faces in the vertical direction. The paddle 48 can be moved parallel to the surface of the substrate W by a drive device 50. The intermediate mask 46 may be an adjustment plate called a regulation plate.

An anode mask 52 is attached to the anode holder 44. The anode mask 52 having an opening is fixed to the anode holder 44 by a fixing unit 54. The anode mask 52 may be installed separately from the anode holder 44.

When a voltage is applied between the anode 62 and the substrate W from the external power source 80, electrons flow from the anode 62 to the substrate W via the external power source 80. The electrons reduce metal ions near the substrate W in the plating solution 60 and the surface of the substrate W is plated.

In the outer periphery of the plating tank 42, an outer tank 66 that receives the plating solution 60 overflowing from the plating tank 42 is provided. The plating device includes a circulation mechanism 68 that circulates the plating solution 60 between the plating tank 42 and the outer tank 66. The circulation mechanism 68 includes a circulation line 70 that connects the outer tank 66 to the plating tank 42. A valve 72, a pump 74, a temperature control device 76 and a filter 78 are provided in the circulation line 70. The plating solution 60 flowing into the circulation mechanism 68 from a discharge port 30 of the outer tank 66 returns to the plating tank 42 from a supply port 32 via the valve 72, the pump 74, the temperature control device 76, and the filter 78.

The in-plane uniformity of the plating film is affected by wafer specifications that specify the configuration of the substrate W, process conditions that specify control of an electroplating treatment, and hardware conditions that specify the configuration in the plating tank. In the first embodiment, a seed layer thickness Wa and an aperture ratio Wb are exemplified as variables for wafer specifications. The aperture ratio Wb is an area proportion of an electroactive surface of the substrate W on which a plating film is formed. Similarly, examples of variables for the process conditions include a plating time Pa, a target thickness Pb of a plating film, a current density Pc, and a plating solution type Pd. The plating solution type Pd may be indicated by any of strong acid, moderate acid and weak acid values. Predetermined values corresponding to strong acidity, moderate acidity and weak acidity are separately assigned. For example, strong acidity=3, moderate acidity=2, and weak acidity=1. Similarly, examples of variables for the hardware conditions include an anode mask size Ha and an intermediate mask size Hb. The anode mask size Ha represents the diameter of the circular opening in the anode mask 52 or the size of the opening. The intermediate mask size Hb represents the diameter of the circular opening in the intermediate mask 46. The implement conditions for the plating treatment are specified by these variables.

In the related art, favorable implement conditions are determined by feedback control in which implement conditions are adjusted by repeating trial. That is, the plating treatment is tried, the thickness of the plating film on the plated substrate W is measured, the in-plane uniformity value is calculated from the thickness distribution of the plating film, the implement conditions are changed until a target in-plane uniformity value is obtained, and the trial is repeated. Determination of the adjustment value of the implement conditions and prediction of improvement of the in-plane uniformity accordingly depend on knowledge and experience regarding the plating treatment. Therefore, unless the operator is a skilled person, a large number of man-hours is required for adjustment. Not only in initial setting for mass production, but also in the mass production procedure, it is necessary to reset the implement conditions again due to change in the specifications of the substrate to be processed. Therefore, in order to improve the quality of plated products and improve the production efficiency, it is required to adjust the implement conditions accurately and quickly.

In the present embodiment, favorable implement conditions are predicted before feedback control and feedforward control is performed by applying the implement conditions. Accordingly, highly suitable results are obtained from the initial stage of feedback control and thus the number of man-hours for adjusting the implement conditions is reduced. That is, the number of trials for obtaining a target in-plane uniformity value is minimized. In addition, even an operator with little knowledge and experience related to the plating treatment can be expected to be able to perform adjustment relatively easily.

Figure 2:
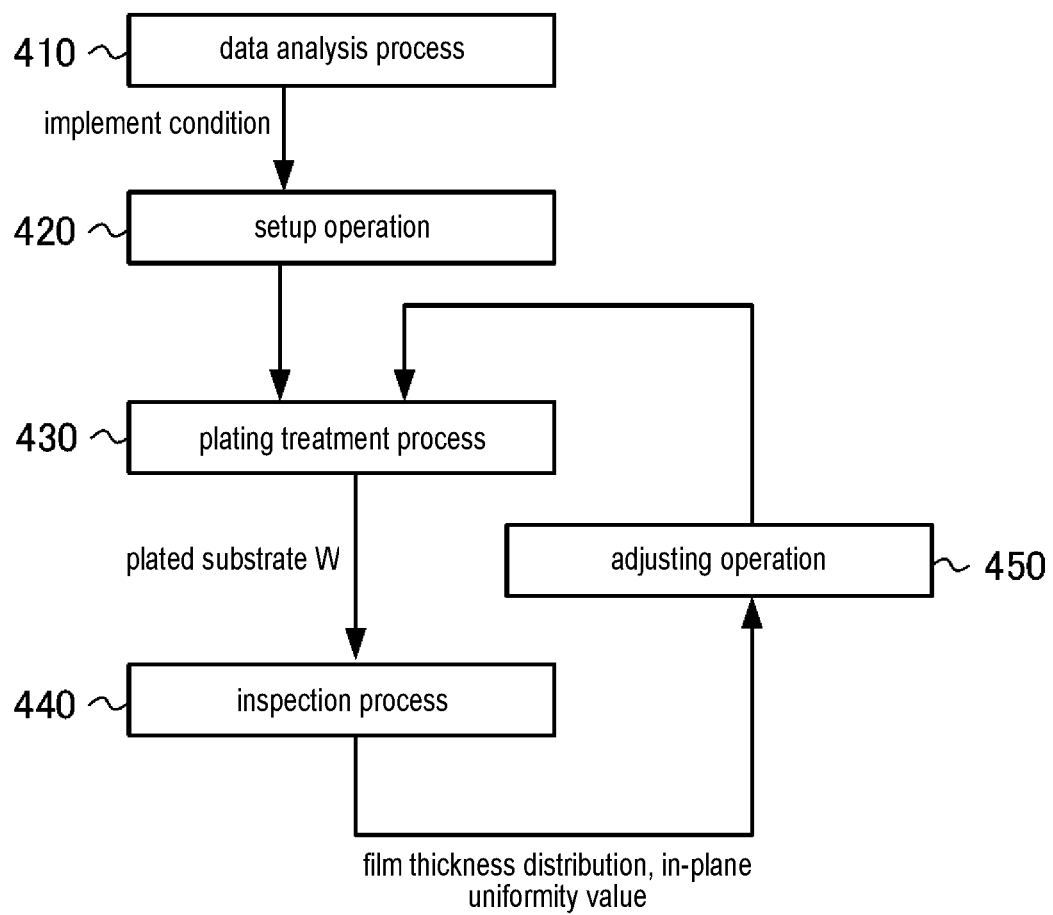
FIG. 2 is a conceptual diagram of feedforward control and feedback control.

FIG. 2 is a conceptual diagram of feedforward control and feedback control.

In a data analysis process 410, favorable implement conditions are predicted according to simulation and regression analysis techniques. In the related art, hardware conditions and process conditions suitable for prerequisite wafer specifications are arbitrarily selected. Here, the implement conditions include the wafer specifications, the hardware conditions and the process conditions. The data analysis process 410 will be described below in detail.

In a setup operation 420, an operator sets up a plating device according to the implement conditions obtained from the data analysis process 410. Specifically, the operator adjusts the position and the size of adjustable parts as represented by the intermediate mask 46 in the plating tank according to the hardware conditions. The operator sets control parameters of the plating device according to the process conditions. The control parameters are sometimes referred to as a recipe. Content up to here corresponds to feedforward control.

In a plating treatment process 430, the substrate holder on which the substrate W is set is put into the plating tank, and a current is generated to perform the plating treatment. The plating device controls the plating treatment according to the set control parameters and adjusted hardware conditions.

When the plating treatment is completed, the operator removes the plated substrate W, and measures the film thickness distribution of the plating using an inspection device in an inspection process 440. In addition, the inspection device (or any computer) calculates the in-plane uniformity value based on the film thickness distribution.

In an adjusting operation 450, the operator refers to the film thickness distribution and the in-plane uniformity value, which are the inspection results, makes a determination to predict implement conditions for improving the in-plane uniformity, and moves to the next trial. That is, the setup operation 420, the plating treatment process 430, and the inspection process 440 are repeated. Generally, the wafer specifications do not change and one or both of the hardware conditions and the process conditions change. These processes are continuously repeated until a target in-plane uniformity value is obtained. This repetition corresponds to feedback control. Hereinafter, operations of the plating support system will be described using the data analysis process 410 as a principal part.

Figure 3:
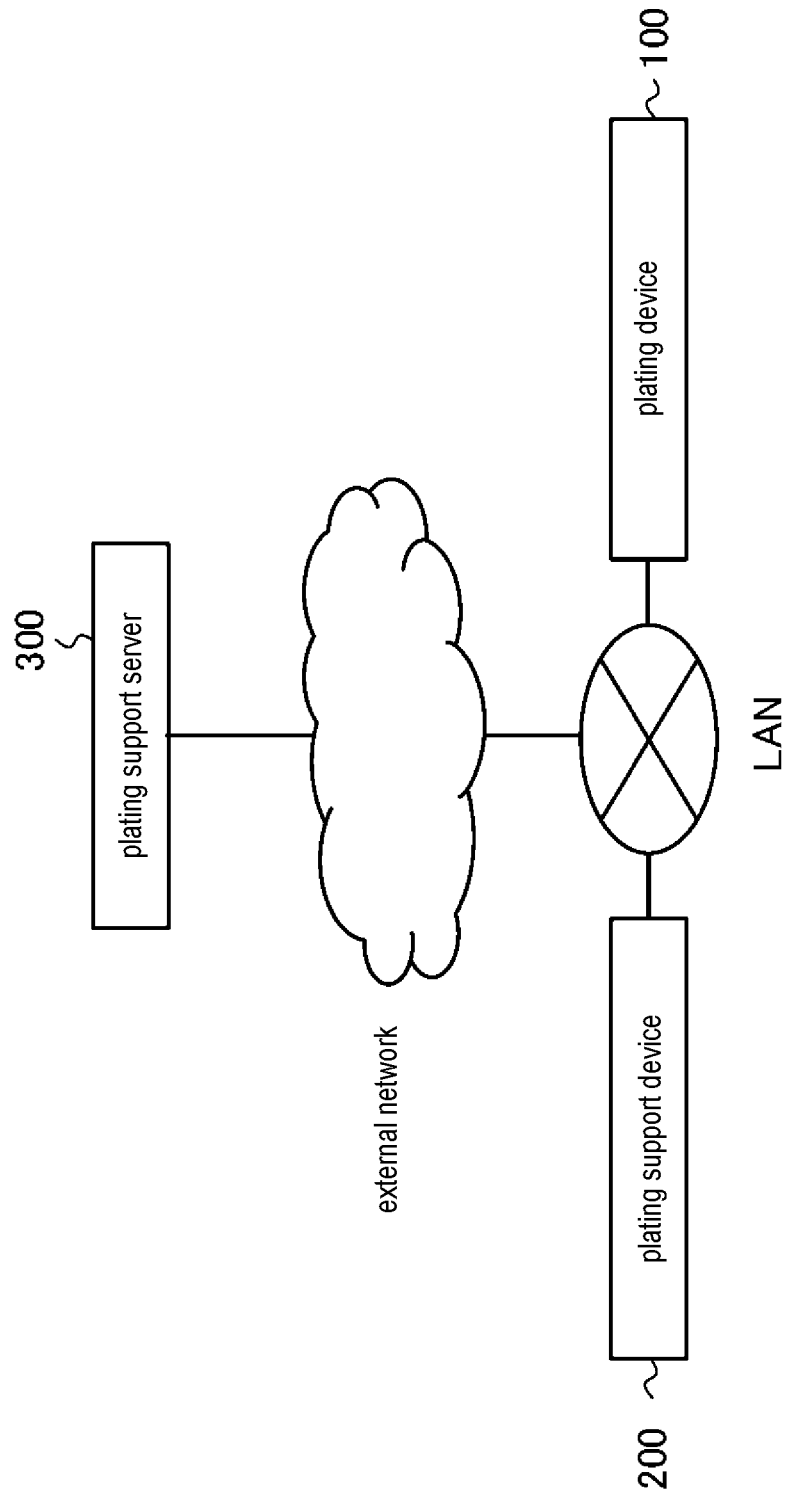
FIG. 3 is a configuration diagram of a plating support system.

FIG. 3 is a configuration diagram of a plating support system.

A plating support device 200 attached to a plating device 100 is connected to the plating device 100 via, for example, a local area network (LAN). The plating support device 200 is connected to a plating support server 300 via an external network (for example, the Internet or a dedicated line). The plating support server 300 provides a service related to the data analysis process 410 to the plating support device 200. The data analysis process 410 is performed by functions of the plating support server 300 and the plating support device 200. The plating support server 300 is provided from, for example, a manufacturer of the plating device 100. The plating device 100 and the plating support device 200 are held by a user of the plating device 100.

Figure 4:
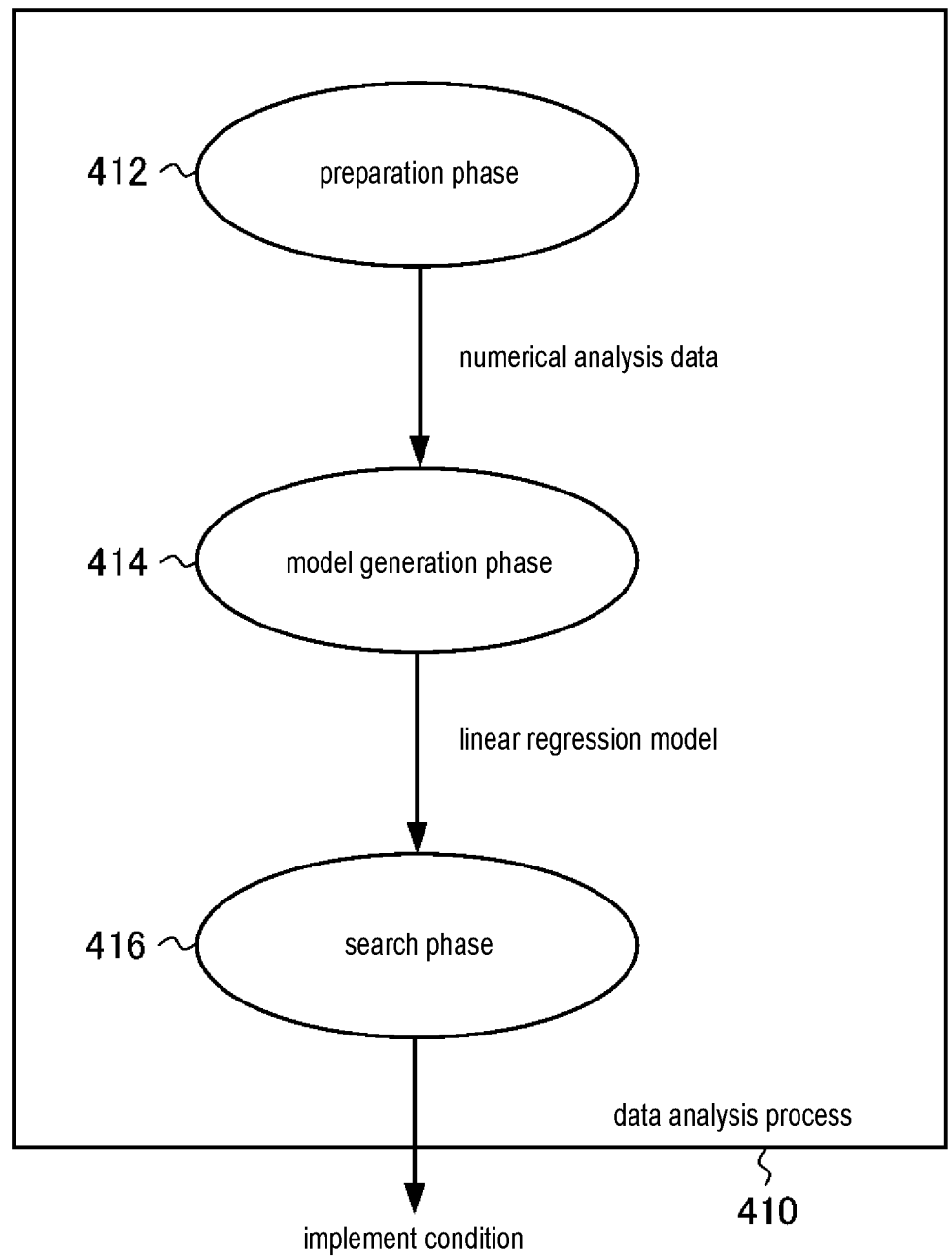
FIG. 4 is a phase transition diagram in a data analysis process.

FIG. 4 is a phase transition diagram in the data analysis process 410.

In the data analysis process 410, a preparation phase 412, a model generation phase 414 and a search phase 416 proceed in this order. In the first embodiment, the process of the preparation phase 412 is performed in the plating support server 300, and the process of the model generation phase 414 and the process of the search phase 416 are performed in the plating support device 200. Other implementations will be described in a second embodiment to a fourth embodiment.

In the preparation phase 412, the in-plane uniformity value is estimated by a simulation for each of a plurality of assumed conditions, and numerical analysis data that is the basis for regression analysis is prepared. The assumed conditions include the same types of variables as in the implement conditions. That is, the assumed conditions define wafer specifications, hardware conditions, and process conditions. However, the plating treatment is not actually performed under these conditions, and these conditions are called assumed conditions because they are used in numerical analysis. The simulator analyzes an electric field in the plating tank based on the wafer specifications, hardware conditions and process conditions and estimates a procedure of forming a plating film on the substrate W. Then, the simulator obtains a film thickness distribution of the coating film on the substrate W when the plating treatment is completed. The film thickness distribution data includes a set of coordinates of a plurality of positions set at a uniform density on the substrate W and the thickness of the plating film at those positions. The in-plane uniformity value is calculated by a known method based on the film thickness distribution. The in-plane uniformity value is defined as, for example, the standard deviation of the film thickness/average film thickness. Alternatively, the in-plane uniformity value may be defined as the difference between the maximum value and the minimum value of the film thickness/average film thickness. That is, a small in-plane uniformity value indicates high in-plane uniformity and a large in-plane uniformity value indicates low in-plane uniformity.

FIG. 5 is a structure diagram of numerical analysis data.

The numerical analysis data is, for example, in a table format. One record shows one sample, and corresponds to a simulation performed for each assumed condition. The simulator performs a simulation for a plurality of different assumed conditions and predicts the in-plane uniformity value in each assumed condition. That is, it is shown that the in-plane uniformity value U is obtained as a result of performing a simulation with respect to the assumed conditions. The assumed conditions include explanatory variables in the regression model formula. In this example, as variables for the assumed conditions, a seed layer thickness Wa, an aperture ratio Wb, a plating time Pa, a target thickness Pb of a plating film, a current density Pc, a plating solution type Pd, an anode mask size Ha and an intermediate mask size Hb are set. For the variables, a plurality of assumed values within a predetermined range are selected, and assumed conditions are generated by combining these assumed values. For example, when N assumed values are selected for 7 variables other than the plating solution type Pd, and 3 assumed values are selected for the plating solution type Pd, $M=N^7 \times 3$ assumed conditions are generated.

Description will return to FIG. 4. In the model generation phase 414, a regression model is generated by regression analysis based on numerical analysis data. In the first embodiment to the fourth embodiment, an example of generating a linear regression model will be described. A modified example of generating a non-linear regression model will be described below.

In the linear regression model, the following Formula 1 is used.

$$Y = \beta_0 + \beta_1 \times X_1 + \beta_2 \times X_2 + \beta_3 \times X_3 + \ldots + \beta_i \times X_i + E \quad \text{[Formula 1]}$$

Y represents an objective variable. i represents the number of explanatory variables. $X_1$ represents a first explanatory variable, $X_2$ represents a second explanatory variable, $X_3$ represents a third explanatory variable, and $X_i$ represents an i-th explanatory variable. $\beta_0$ represents a constant, $\beta_1$ represents a first coefficient, $\beta_2$ represents a second coefficient, $\beta_3$ represents a third coefficient, and $\beta_i$ represents an i-th coefficient. E represents an error term. The error term E follows a normal distribution. That is, the error term E can be specified by the mean and standard deviation.

In the linear regression model in the present embodiment, the in-plane uniformity value U corresponds to the objective variable Y. When the first explanatory variable $X_1$ is the seed layer thickness Wa, the second explanatory variable $X_2$ is the aperture ratio Wb, the third explanatory variable $X_3$ is the plating time Pa, the fourth explanatory variable $X_4$ is the target thickness Pb of the plating film, the fifth explanatory variable $X_5$ is the current density Pc, the sixth explanatory variable $X_6$ is the plating solution type Pd, the seventh explanatory variable $X_7$ is the anode mask size Ha, and the eighth explanatory variable $X_8$ is the intermediate mask size Hb, the linear regression model in this example uses the following Formula 2.

$$U = \beta_0 + \beta_1 \times Wa + \beta_2 \times Wb + \beta_3 \times Pa + \beta_4 \times Pb + \beta_5 \times Pc + \beta_6 \times Pd + \beta_7 \times Ha + \beta_8 \times Hb + E \quad \text{[Formula 2]}$$

When regression analysis is performed based on the above numerical analysis data, the constant $\beta_0$, the first coefficient $\beta_1$ to eighth coefficient $\beta_8$ and the error term E are determined. Accordingly, the linear regression model is specified.

In the search phase 416, implement conditions in which the in-plane uniformity of the plating film formed in the electroplating treatment of the substrate W to be actually plated is further improved are searched for using the linear regression model. The operator can designate some variables among the variables for the implement conditions. In this example, the operator designates values of the seed layer thickness Wa, the aperture ratio Wb, the plating time Pa, the target thickness Pb of the plating film, and the plating solution type Pd.

FIG. 6 is a diagram showing an example of an input screen.

An input screen for receiving values of the above variables is displayed on a display of the plating support device 200. The operator operates an input device such as a keyboard and a mouse of the plating support device 200 and inputs these designated values.

For the remaining variables for the implement conditions, a plurality of patterns combining candidate values are generated. In this example, a plurality of candidate values is provided for the current density Pc, the anode mask size Ha, and the intermediate mask size Hb, and they are combined. Then, the candidate values of each pattern are combined with the values designated by the operator to obtain candidate conditions. The candidate conditions are set in search data.

FIG. 7 is a structure diagram of search data.

The search data is, for example, in a table format, and has a record for each candidate condition. In this example, the seed layer thickness Wa_in(nm), the aperture ratio Wb_in (%), the plating time Pa_in(sec), the target thickness Pb_in ($\mu$m) of the plating film, and the plating solution type Pd=moderate acidity are designated. In this example, the plating support device 200 provides candidate values at predetermined intervals (for example, 0.1) for the current density Pc in a range of Pc_min to Pc_max($10^{-2}$ A/m$^2$). In addition, the plating support device 200 provides candidate values at predetermined intervals (for example, 1) for the anode mask size Ha in a range of Ha_min to Ha_max(mm). In addition, the plating support device 200 provides candidate values at predetermined interval (for example, 1) for the intermediate mask size Hb in a range of Hb_min to Hb_max (mm).

Then, in order of the seed layer thickness Wa, the aperture ratio Wb, the plating time Pa, the target thickness Pb of the plating film, the current density Pc, the plating solution type Pd, the anode mask size Ha and the intermediate mask size Hb, candidate conditions are generated according to R (=number of candidate values of current density Pc×number of candidate values of anode mask size Ha×number of candidate values of intermediate mask size Hb) from [Wa_in, Wb_in, Pa_in, Pb_in, Pc_min, moderate acidity, Ha_min, Hb_min] to [Wa_in, Wb_in, Pa_in, Pb_in, Pc_max, moderate acidity, Ha_max, Hb_max].

The plating support device 200 applies the values of the assumed conditions to the linear regression model and calculates the in-plane uniformity value u from u1 to uR. The in-plane uniformity value u is associated with the assumed conditions in the search data.

The plating support device 200 specifies assumed conditions corresponding to the minimum value among the in-plane uniformity values u from u1 to uR and sets them as implement conditions. If the in-plane uniformity value uS in the assumed conditions [Wa_in, Wb_in, Pa_in, Pb_in, Pc_s, moderate acidity, Ha_s, Hb_s] is a minimum, it is estimated that the in-plane uniformity u is the highest in the implement conditions of the current density Pc_s($10^{-2}$ A/m$^2$), the anode mask size Ha_s(mm), and the intermediate mask size Hb_s (mm).

Figure 8:
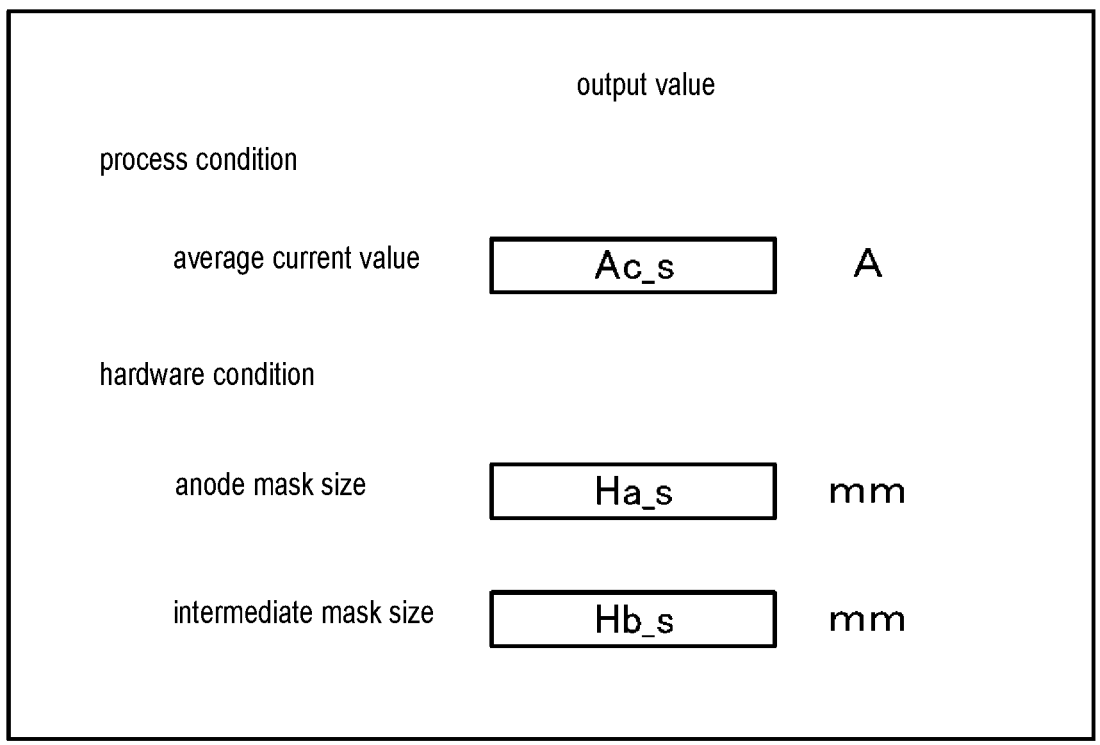
FIG. 8 is a diagram showing an example of an output screen.

FIG. 8 is a diagram showing an example of an output screen.

The estimation results are displayed on a display as an output screen of the plating support device 200. In the case of the above example, the average current value Ac_s(A) calculated from the current density Pc_s($10^{-2}$ A/m$^2$), the anode mask size Ha_s(mm), and the intermediate mask size Hb_s(mm) are displayed on the output screen. In this case, like the plating time=Pa_in(sec), the designated value of the operator may be displayed together therewith. In addition, the estimated in-plane uniformity value may be displayed together therewith.

Performing a simulation with respect to all assumed conditions is not realistic due to a large processing load. Therefore, the assumed conditions have to be discrete. Therefore, even if there are implement conditions better than the assumed conditions, they may be overlooked.

In the present embodiment, since a regression model is generated based on the simulation results, and the in-plane uniformity value in various candidate conditions is determined by the regression model, favorable implement conditions can be extracted from among continuous candidate conditions. For example, implement conditions that are within the assumed conditions in the simulation can be selected. That is, conditions can be selected more precisely. When a regression analysis technique is used, it is meaningful to supplement a range that cannot be predicted by the simulation alone.

In addition, since basic data of regression analysis is generated by the simulation, there is no need to perform the actual test, and costs can be reduced. Generally, it is easy to determine implement conditions for improving the in-plane uniformity obtained in the plating treatment.

In addition, the correlation map and the influence degree graph are also displayed on the output screen.

Figure 9:
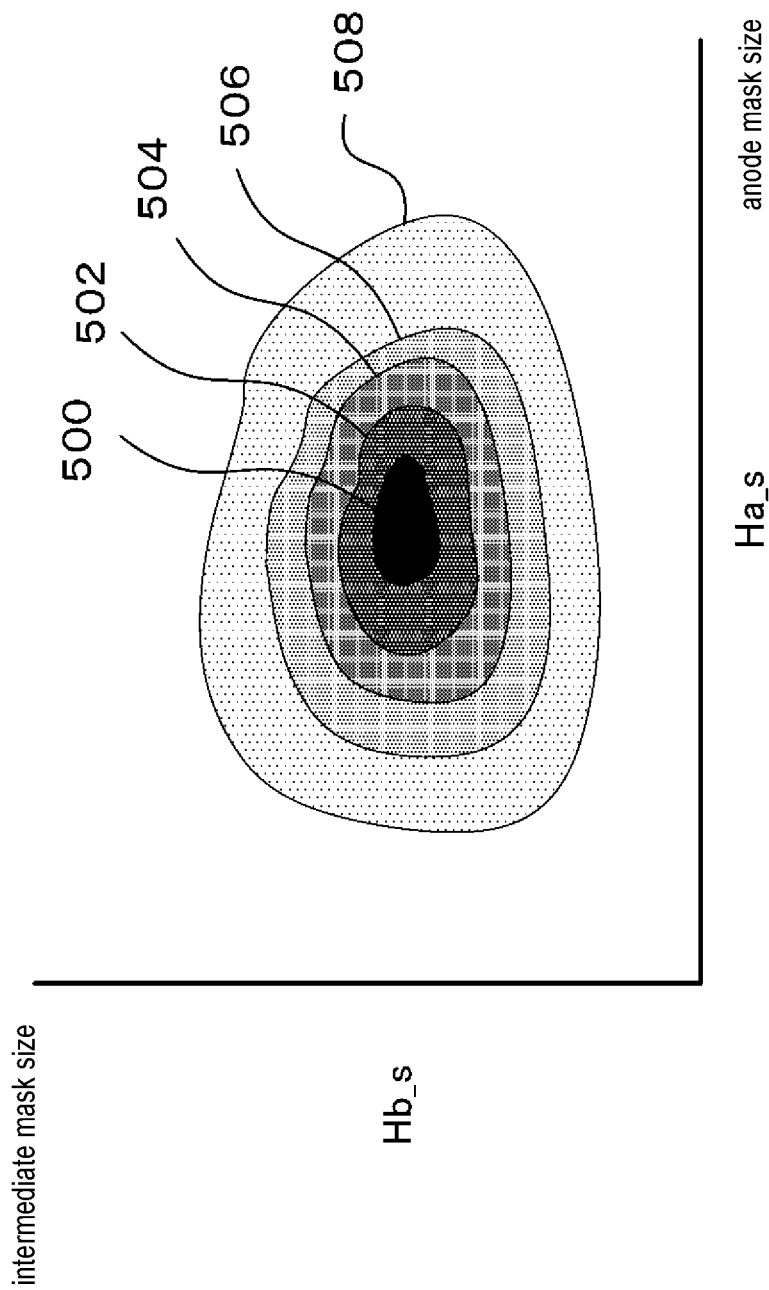
FIG. 9 is an example of a correlation map.

FIG. 9 is an example of a correlation map.

The horizontal axis represents the anode mask size Ha. The vertical axis represents the intermediate mask size Hb. In the coordinate space, the in-plane uniformity values u estimated to correspond to the anode mask size Ha and the intermediate mask size Hb are color-coded. A position corresponding to the conditions in which the in-plane uniformity value u becomes small is shown in a warm color and a position corresponding to the conditions in which the in-plane uniformity value u becomes large is shown in a cool color. A central region 500 is displayed in red, a first peripheral region 502 is displayed in orange, a second peripheral region 504 is displayed in yellow, a fourth peripheral region 506 is displayed in green, and a fifth peripheral region 508 is displayed in blue. The gradation is shown in 5 stages due to space limitations, but it may be represented in more stages. Gradation may be shown by other color expressions such as brightness and saturation. Alternatively, the in-plane uniformity value u may be shown in the contour diagram.

When the anode mask size Ha or the intermediate mask size Hb is changed, the operator can ascertain a degree of influence on the in-plane uniformity value u at a glance with reference to the correlation map.

In this example, a mode in which the in-plane uniformity value u changes depending on the relationship between the anode mask size Ha and the intermediate mask size Hb is shown. However, a mode in which the in-plane uniformity value u changes depending on the relationship between other two variables may be shown. The correlation map is an example of a graph that collectively represents the relationship between values of two or more variables included in each condition and the in-plane uniformity value u with respect to a plurality of conditions that can be implemented for the electroplating treatment of the substrate to be plated.

Figure 10:
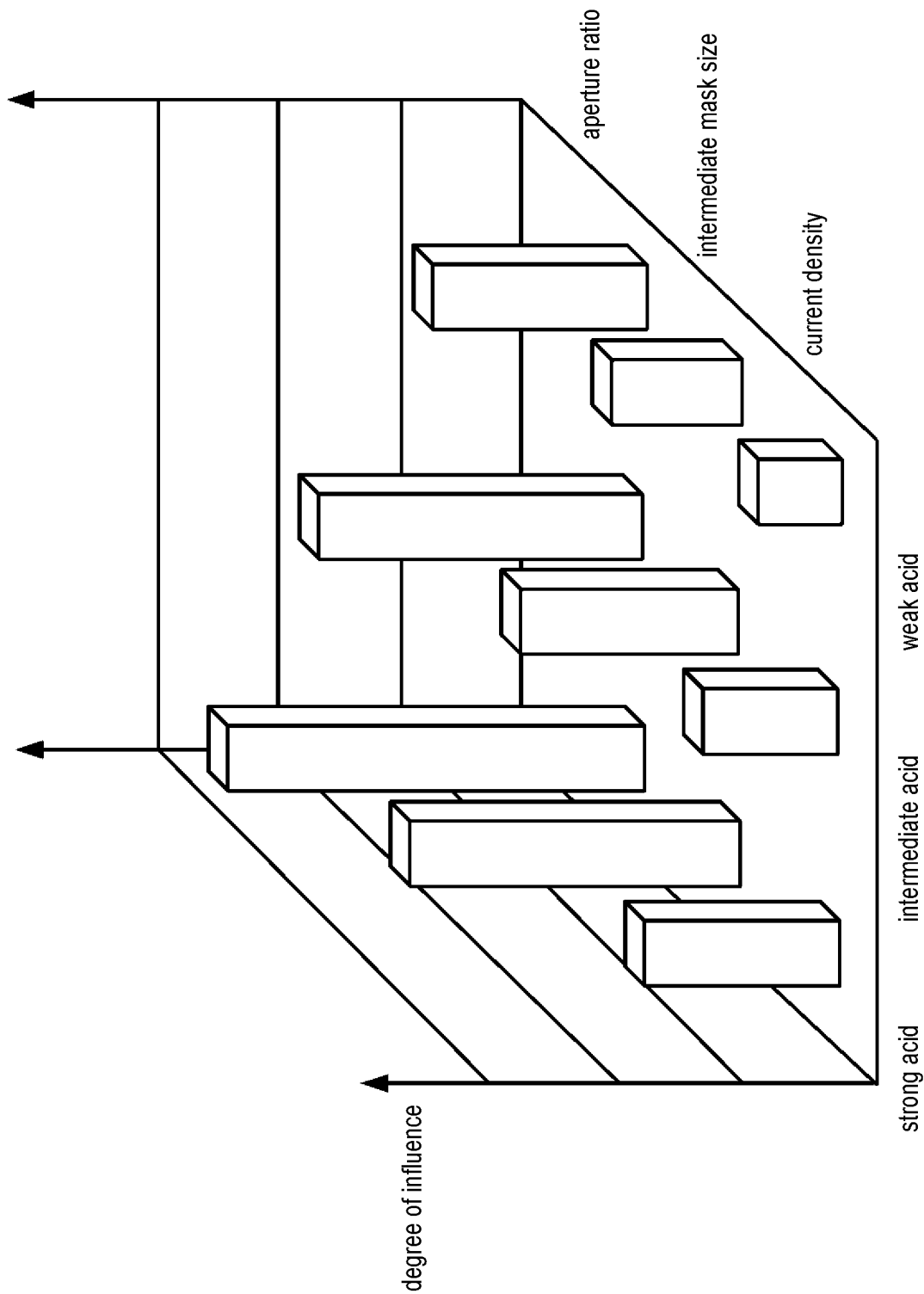
FIG. 10 is an example of an influence degree graph.

FIG. 10 is an example of an influence degree graph.

In this example, the degree of influence on the in-plane uniformity value u with respect to the current density Pc, the intermediate mask size Hb, and the aperture ratio Wb is shown as a 3D bar graph. The left column shows the degree of influence of the current density Pc, the intermediate mask size Hb and the aperture ratio Wb with a length of the bar when the plating solution type Pd is strongly acidic. The center column shows the degree of influence of the current density Pc, the intermediate mask size Hb and the aperture ratio Wb with a length of the bar when the plating solution type Pd is moderate acidic. The right column shows the degree of influence of the current density Pc, the intermediate mask size Hb and the aperture ratio Wb with a length of the bar when the plating solution type Pd is weakly acidic. For the degree of influence, for example, a value obtained by normalizing the correlation coefficient obtained by analyzing search data is used. The correlation coefficient indicates the strength of the correlation between the in-plane uniformity value u and the variable.

The operator can ascertain which of variables of the current density Pc, the intermediate mask size Hb and the aperture ratio Wb is more likely to influence the in-plane uniformity value u at a glance with reference to the influence degree graph. An influence degree graph for explanatory variables other than the current density Pc, the intermediate mask size Hb and the aperture ratio Wb exemplified here may be shown.

Here, the output screen is sent from the plating support device 200 to the plating device 100, and is also displayed on the display of the plating device 100. This is for the convenience of the setup operation 420. The operator starts the setup operation 420 of the plating device 100 with reference to the output screen.

Here, the preparation phase 412, the model generation phase 414 and the search phase 416 may or may not be continuous over time. There may be some time from when the preparation phase 412 is completed until the model generation phase 414 starts. There may be some time from when the model generation phase 414 is completed until the search phase 416 starts. The processes of the phases may be performed by either the plating support server 300 or the plating support device 200. Other implementation examples will be described in the second embodiment to the fourth embodiment.

Figure 11:
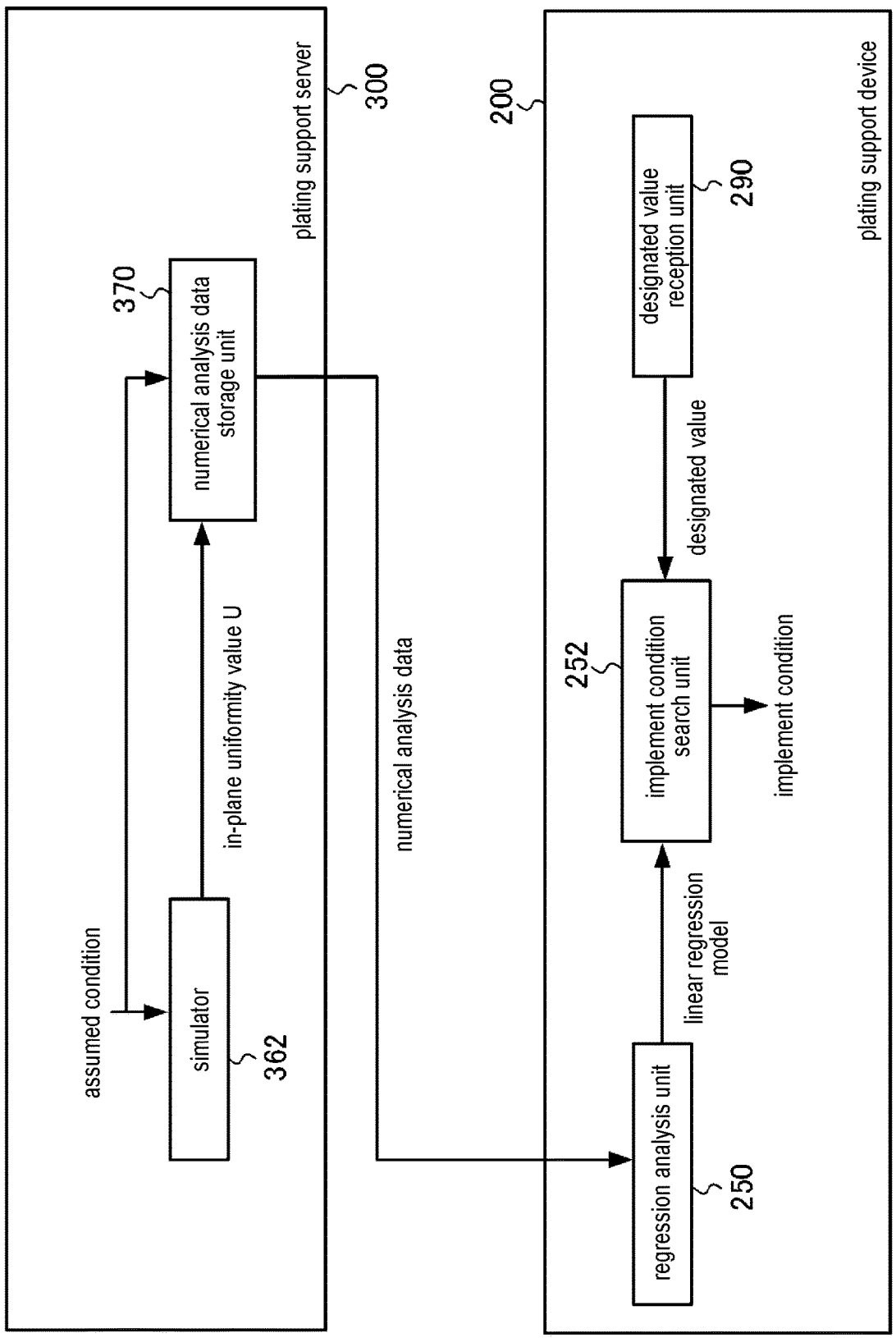
FIG. 11 is a schematic diagram of an overall process in a first embodiment.

FIG. 11 is a schematic diagram of an overall process in the first embodiment.

The overall process will be described briefly before detailed description. The plating support server 300 in the first embodiment includes a simulator 362 and a numerical analysis data storage unit 370 in order to perform a process of the preparation phase 412. The simulator 362 performs a simulation based on assumed conditions and calculates an in-plane uniformity value. The in-plane uniformity value is associated with the assumed conditions and stored in the numerical analysis data storage unit 370. Other functional blocks will be described below.

The plating support device 200 in the first embodiment includes a regression analysis unit 250, an implement condition search unit 252, and a designated value reception unit 290 in order to perform a process of the model generation phase 414 and a process of the search phase 416. The plating support device 200 obtains numerical analysis data from the plating support server 300 and the regression analysis unit 250 estimates a regression model based on numerical analysis data. The designated value reception unit 290 receives values for some variables designated by the operator, and the implement condition search unit 252 applies candidate conditions on the assumption of designated values to a regression model and calculates an in-plane uniformity value. Candidate conditions corresponding to better in-plane uniformity values are recommended as implement conditions. Other functional blocks will be described below.

Components of the plating support server 300 and the plating support device 200 included in the plating support system are realized by arithmetic units such as a central processing unit (CPU) and various coprocessors, storage devices such as a memory and a storage, hardware including wired or wireless communication lines connecting them, and software that is stored in the storage device and applies processing instructions to the arithmetic units. The computer program may include a device driver, an operating system, various application programs installed on the upper layer thereof, and libraries that provide common functions to these programs. Each block described below shows a block of a functional unit, rather than the configuration for each hardware unit.

Figure 12:
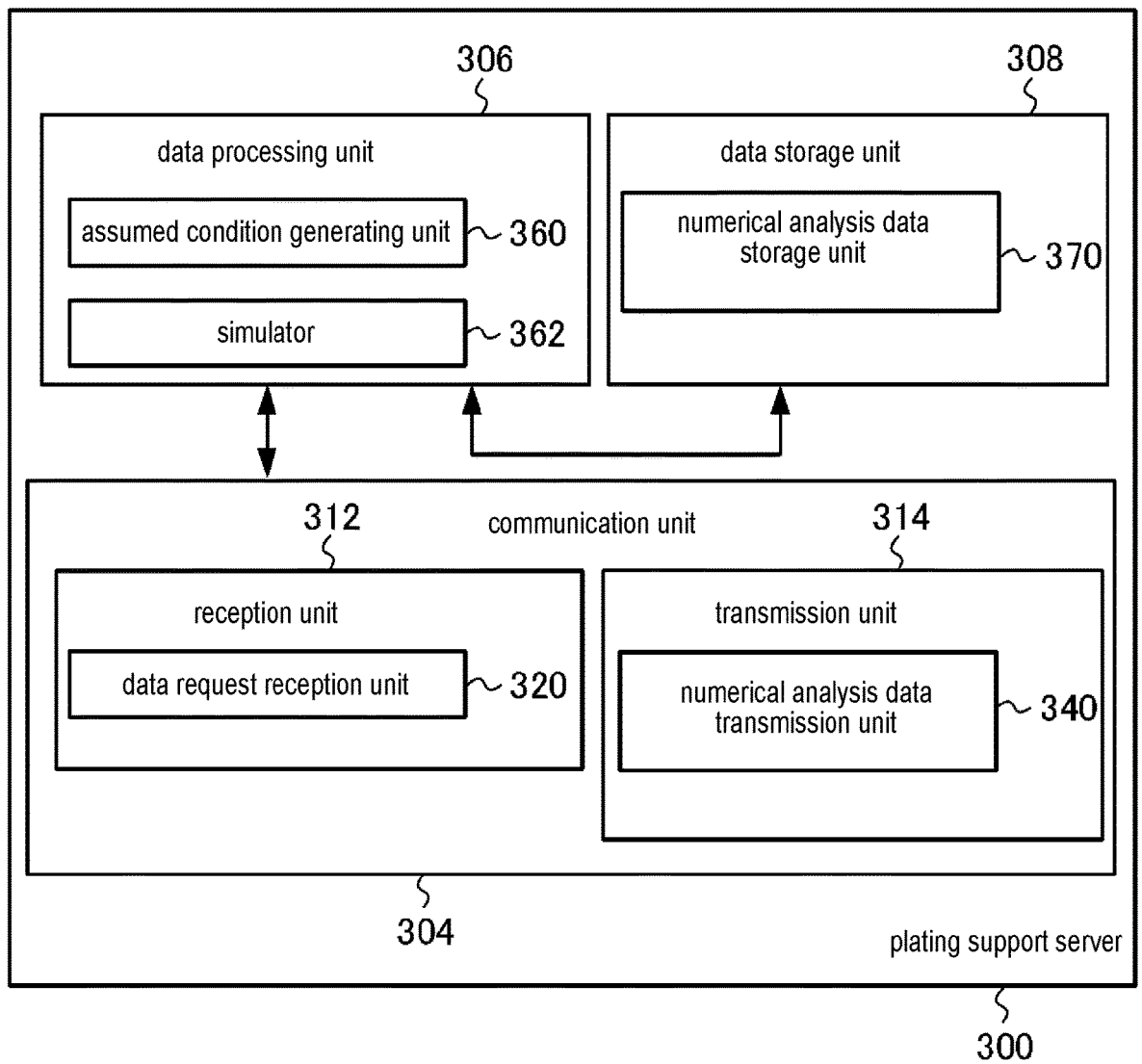
FIG. 12 is a functional block diagram of a plating support server in the first embodiment.

FIG. 12 is a functional block diagram of the plating support server 300.

The plating support server 300 includes a communication unit 304, a data processing unit 306 and a data storage unit 308.

The communication unit 304 performs a communication process with the plating support device 200 via an external network and a LAN. The data storage unit 308 stores various types of data. The data processing unit 306 executes various processes based on the data acquired by the communication unit 304 and the data stored in the data storage unit 308. The data processing unit 306 also functions as an interface between the communication unit 304 and the data storage unit 308.

The data processing unit 306 includes an assumed condition generating unit 360 and the simulator 362. The assumed condition generating unit 360 generates assumed conditions as described above.

The data storage unit 308 includes the numerical analysis data storage unit 370. The numerical analysis data storage unit 370 stores the numerical analysis data exemplified in FIG. 5.

The communication unit 304 includes a reception unit 312 configured to receive data and a transmission unit 314 configured to transmit data. The reception unit 312 includes a data request reception unit 320. The data request reception unit 320 receives a data request from the plating support device 200. The data request means a request for numerical analysis data. The transmission unit 314 includes a numerical analysis data transmission unit 340. The numerical analysis data transmission unit 340 transmits numerical analysis data to the plating support device 200.

Figure 13:
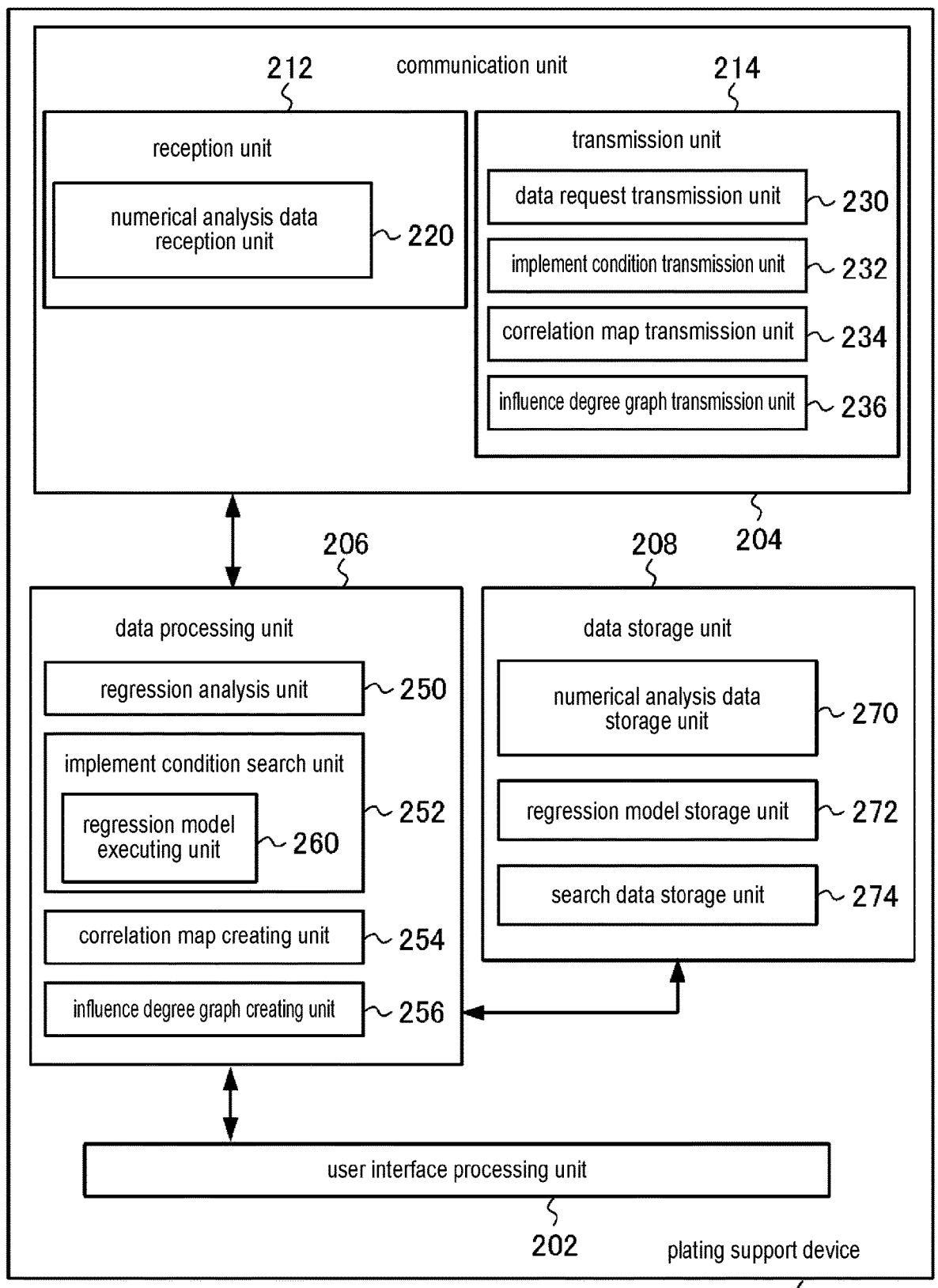
FIG. 13 is a functional block diagram of a plating support device in the first embodiment.
Figure 14:
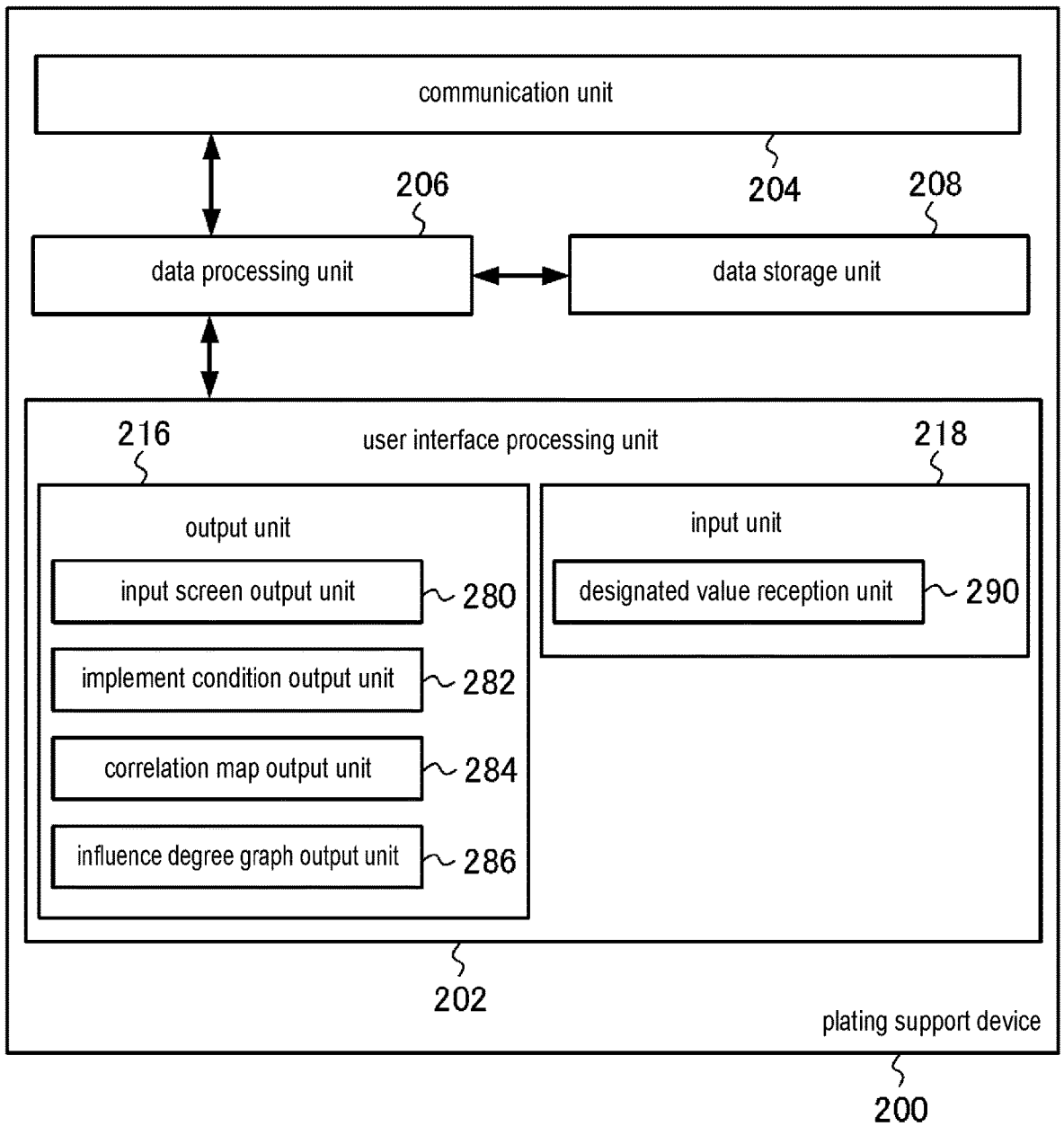
FIG. 14 is a functional block diagram of the plating support device in the first embodiment.

FIG. 13 and FIG. 14 show a functional block diagram of the plating support device 200.

The plating support device 200 includes a communication unit 204, a data processing unit 206, a data storage unit 208 and a user interface processing unit 202. FIG. 13 shows details of the communication unit 204, the data processing unit 206, and the data storage unit 208. FIG. 14 shows details of the user interface processing unit 202.

The communication unit 204 performs a communication process with the plating support server 300 via an external network and a LAN, and additionally performs a communication process for the plating device 100 via a LAN. The data storage unit 208 stores various types of data. The data processing unit 206 performs various processes based on the data acquired by the communication unit 204, operation instructions input via the user interface processing unit 202, and the data stored in the data storage unit 208. The data processing unit 206 also functions as an interface between the communication unit 204, the user interface processing unit 202, and the data storage unit 208. The user interface processing unit 202 receives instructions from the operator via an input device such as a keyboard and a touch panel, and also performs a process related to an user interface such as an image display and an audio output.

The communication unit 204 includes a reception unit 212 configured to receive data and a transmission unit 214 configured to transmit data. The reception unit 212 includes a numerical analysis data reception unit 220. The numerical analysis data reception unit 220 receives numerical analysis data from the plating support server 300.

The transmission unit 214 includes a data request transmission unit 230, an implement condition transmission unit 232, a correlation map transmission unit 234, and an influence degree graph transmission unit 236. The data request transmission unit 230 transmits a data request to the plating support server 300. The implement condition transmission unit 232 transmits implement conditions to the plating device 100. The correlation map transmission unit 234 transmits a correlation map to the plating device 100. The influence degree graph transmission unit 236 transmits an influence degree graph to the plating device 100.

The data processing unit 206 includes the regression analysis unit 250, the implement condition search unit 252, a correlation map creating unit 254, and an influence degree graph creating unit 256. The implement condition search unit 252 includes a regression model executing unit 260. The regression model executing unit 260 applies assumed conditions to a linear regression model and calculates an in-plane uniformity value. The correlation map creating unit 254 creates a correlation map. The influence degree graph creating unit 256 creates an influence degree graph.

The data storage unit 208 includes a numerical analysis data storage unit 270, a regression model storage unit 272, and a search data storage unit 274. The regression model storage unit 272 stores the linear regression model. The search data storage unit 274 stores search data.

As shown in FIG. 14, the user interface processing unit 202 includes an output unit 216 configured to output various types of information such as images and audios to the operator and an input unit 218 configured to receive an input from the operator.

The output unit 216 includes an input screen output unit 280, an implement condition output unit 282, a correlation map output unit 284, and an influence degree graph output unit 286. The input screen output unit 280 outputs an input screen on a display. The implement condition output unit 282 outputs implement conditions on the output screen to the display. The correlation map output unit 284 outputs the correlation map on the output screen to the display. The influence degree graph output unit 286 outputs the influence degree graph on the output screen to the display.

The input unit 218 includes the designated value reception unit 290. The designated value reception unit 290 receives a designated value input on the input screen.

Figure 15:
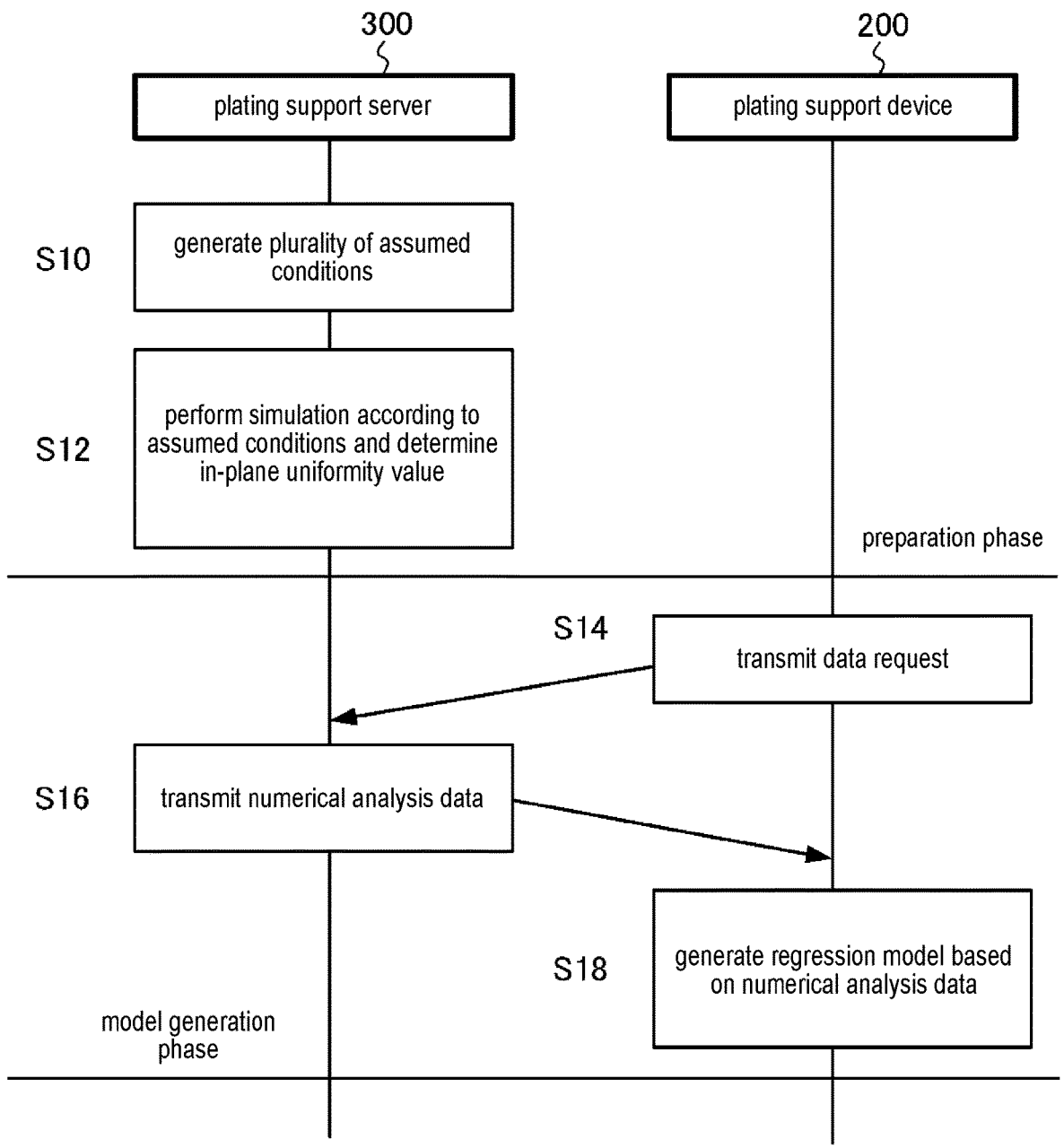
FIG. 15 is a sequence diagram of a preparation phase and a model generation phase in the first embodiment.

FIG. 15 is a sequence diagram of the preparation phase 412 and the model generation phase 414 in the first embodiment.

In the preparation phase 412, the assumed condition generating unit 360 of the plating support server 300 generates a plurality of assumed conditions (S10). The simulator 362 performs a simulation according to the generated assumed conditions and determines an in-plane uniformity value (S12). The assumed conditions and the in-plane uniformity value are stored in the numerical analysis data storage unit 270.

In the model generation phase 414, the data request transmission unit 230 of the plating support device 200 transmits a data request to the plating support server 300 (S14). As described above, the data request means a request for numerical analysis data.

When the data request reception unit 320 of the plating support server 300 receives the data request, the numerical analysis data transmission unit 340 transmits numerical analysis data to the plating support device 200 (S16).

The numerical analysis data received by the numerical analysis data reception unit 220 of the plating support device 200 is stored in the numerical analysis data storage unit 270. The regression analysis unit 250 generates a linear regression model based on the numerical analysis data (S18). The generated linear regression model is stored in the regression model storage unit 272.

Figure 16:
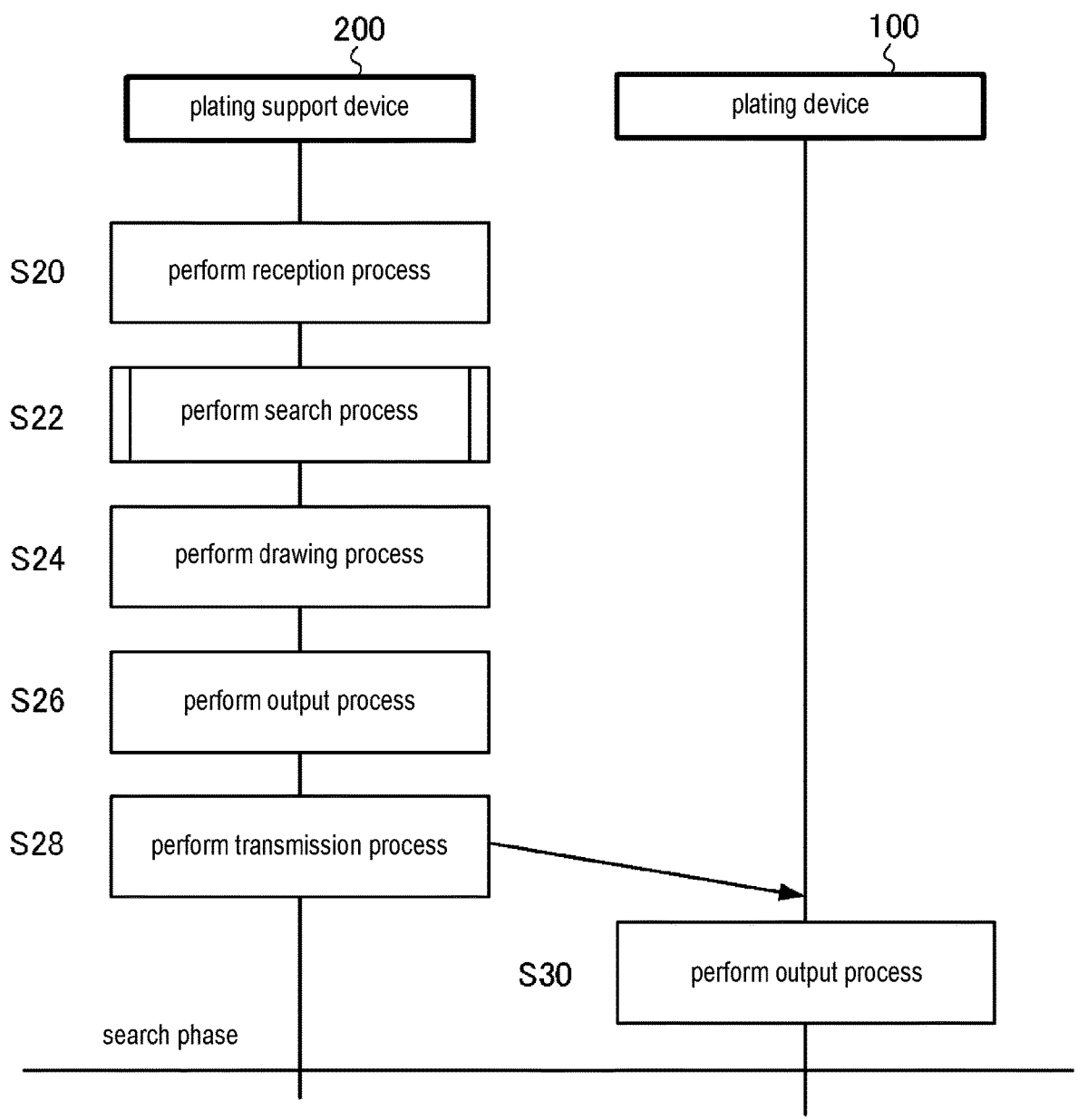
FIG. 16 is a sequence diagram of a search phase in the first embodiment.

FIG. 16 is a sequence diagram of the search phase 416 in the first embodiment.

The input screen output unit 280 and the designated value reception unit 290 of the plating support device 200 perform a process of receiving a designated value (S20). Specifically, the input screen output unit 280 outputs the input screen, and the designated value reception unit 290 receives a designated value input on the input screen.

The implement condition search unit 252 of the plating support device 200 performs a process of searching for implement conditions (S22). This search process will be described below with reference to FIG. 17. The data processing unit 206 performs a process of drawing a correlation map and an influence degree graph (S24). Specifically, the correlation map creating unit 254 creates a correlation map, and the influence degree graph creating unit 256 creates an influence degree graph.

The output unit 216 of the plating support device 200 performs a process of outputting implement conditions, a correlation map and an influence degree graph (S26). Specifically, the implement condition output unit 282 outputs implement conditions on the output screen to the display. The correlation map output unit 284 outputs the correlation map on the output screen to the display. The influence degree graph output unit 286 outputs the influence degree graph on the output screen to the display. The transmission unit 214 performs a process of transmitting implement conditions, a correlation map and an influence degree graph (S28). The implement condition transmission unit 232 transmits implement conditions to the plating device 100. The correlation map transmission unit 234 transmits a correlation map to the plating device 100. The influence degree graph transmission unit 236 transmits an influence degree graph to the plating device 100.

When the reception unit (not shown) of the plating device 100 receives implement conditions, a correlation map and an influence degree graph, the output unit (not shown) of the plating device 100 outputs the implement conditions, the correlation map and the influence degree graph to the display (S30).

Figure 17:
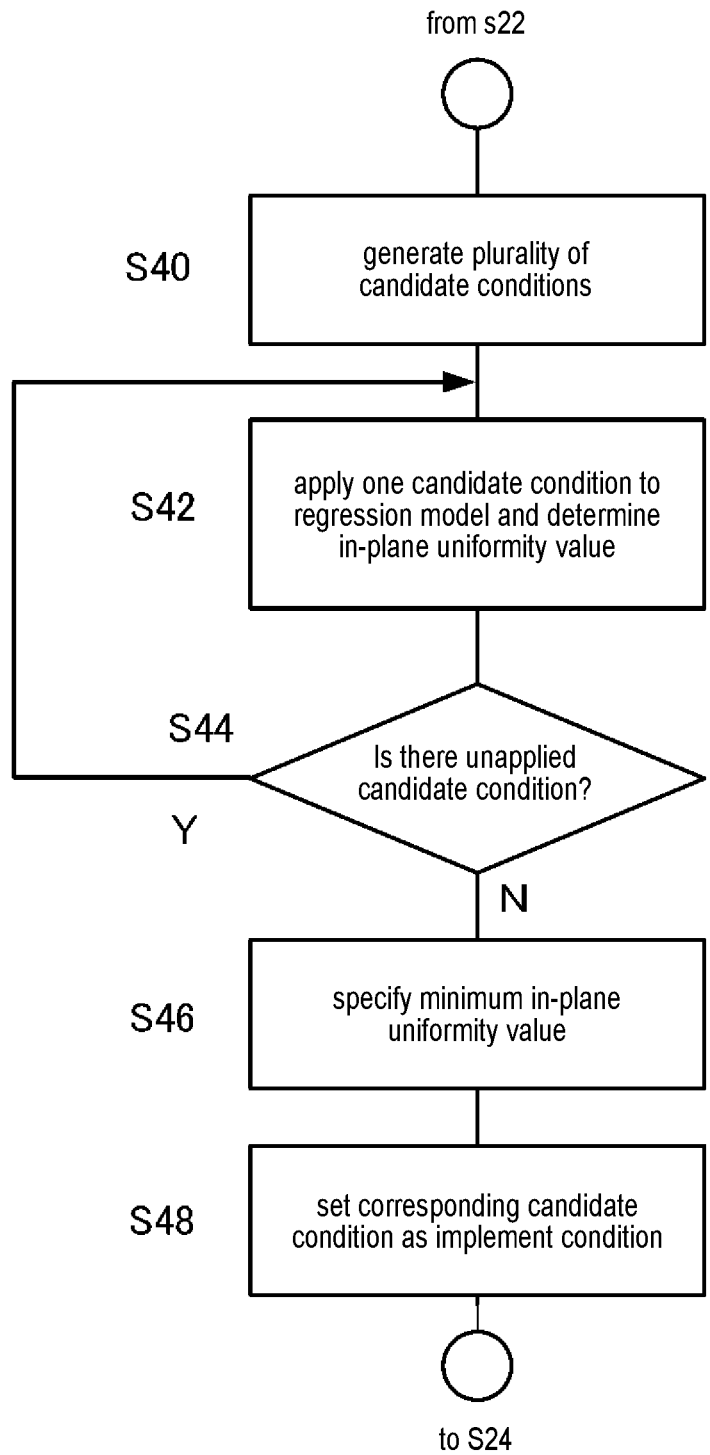
FIG. 17 is a flowchart diagram showing a search processing procedure in the plating support device.

FIG. 17 is a flowchart diagram showing a search processing procedure in the plating support device 200.

The implement condition search unit 252 generates a plurality of candidate conditions as described above (S40). The regression model executing unit 260 applies one candidate condition to a linear regression model and determines an in-plane uniformity value (S42). If there is an unapplied candidate condition (Y in S44), the implement condition search unit 252 applies a next candidate condition in S42. If there is no unapplied candidate condition (N in S44), since the in-plane uniformity values for all candidate conditions have been determined, the implement condition search unit 252 specifies the minimum in-plane uniformity value among them (S46). Then, the implement condition search unit 252 sets a candidate condition corresponding to the minimum in-plane uniformity value as an implement condition (S48). Here, an example of specifying the minimum in-plane uniformity value is shown, but the in-plane uniformity value may not be a minimum. The implement condition search unit 252 applies a linear regression model at least twice and selects a condition corresponding to a smaller in-plane uniformity value. The implement condition search unit 252 may specify an in-plane uniformity value that satisfies a predetermined condition other than the minimum value. Specifically, the implement condition search unit 252 may specify an in-plane uniformity value equal to or lower than the reference value.

Modified Example of First Embodiment

A learning model in which a uniformity value is an objective variable, and one or more variables are explanatory variables may be generated according to machine learning based on numerical analysis data. That is, machine learning may be performed in place of regression analysis, and a learning model may be generated in place of the linear regression model. The plating support device 200 in the modified example of the first embodiment includes the machine learning unit (not shown) in place of the regression analysis unit 250, includes the learning model storage unit (not shown) in place of the regression model storage unit 272, and includes the learning model executing unit (not shown) in place of the regression model executing unit 260.

Figure 18:
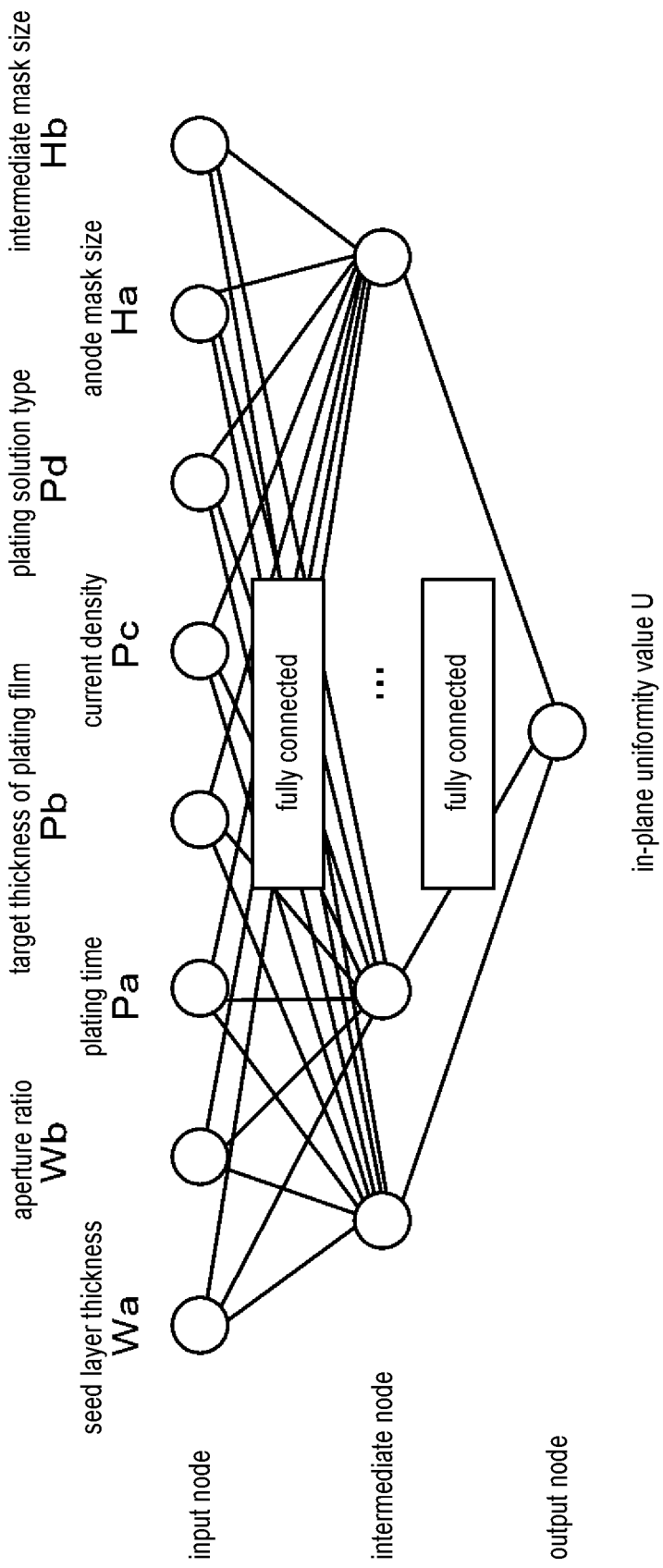
FIG. 18 is a configuration diagram of a neural network.

FIG. 18 is a configuration diagram of a neural network.

For the learning model, for example, a neural network is used. The configuration of the neural network is set in the learning model unit (not shown). The neural network includes a plurality of input nodes corresponding to explanatory variables, a plurality of intermediate nodes, and an output node corresponding to an objective variable. In this example, input nodes corresponding to the seed layer thickness Wa, the aperture ratio Wb, the plating time Pa, the target thickness Pb of the plating film, the current density Pc, the plating solution type Pd, the anode mask size Ha and the intermediate mask size Hb are provided. In addition, an output node corresponding to the in-plane uniformity value U is provided.

In the model generation phase 414, the machine learning unit (not shown) sets values of variables for assumed conditions to input nodes of the variables with respect to samples of numerical analysis data, and sets the in-plane uniformity value U to the output node. Then, the machine learning unit (not shown) adjusts weight data for each sample. In this manner, weight data that is the optimal solution is trained in the neural network. The weight data is stored in the learning model unit (not shown).

In the search phase 416, the learning model executing unit (not shown) sets values of variables included in the candidate condition to input nodes of the variables and performs an operation of the neural network using the trained weight data. Thereby, the in-plane uniformity value u estimated from the output node is obtained. In the implement condition search unit 252, the in-plane uniformity value u obtained from the learning model executing unit (not shown) is used in place of the in-plane uniformity value u obtained from the regression model executing unit 260.

If the accuracy of estimating the in-plane uniformity value u is higher in the machine learning than in regression analysis, the in-plane uniformity value u may be estimated by machine learning.

Second Embodiment

In the second embodiment, an example in which the plating support server 300 performs a process of the preparation phase 412 and a process of the model generation phase 414, and the plating support device 200 performs a process of the search phase 416 will be described.

Figure 19:
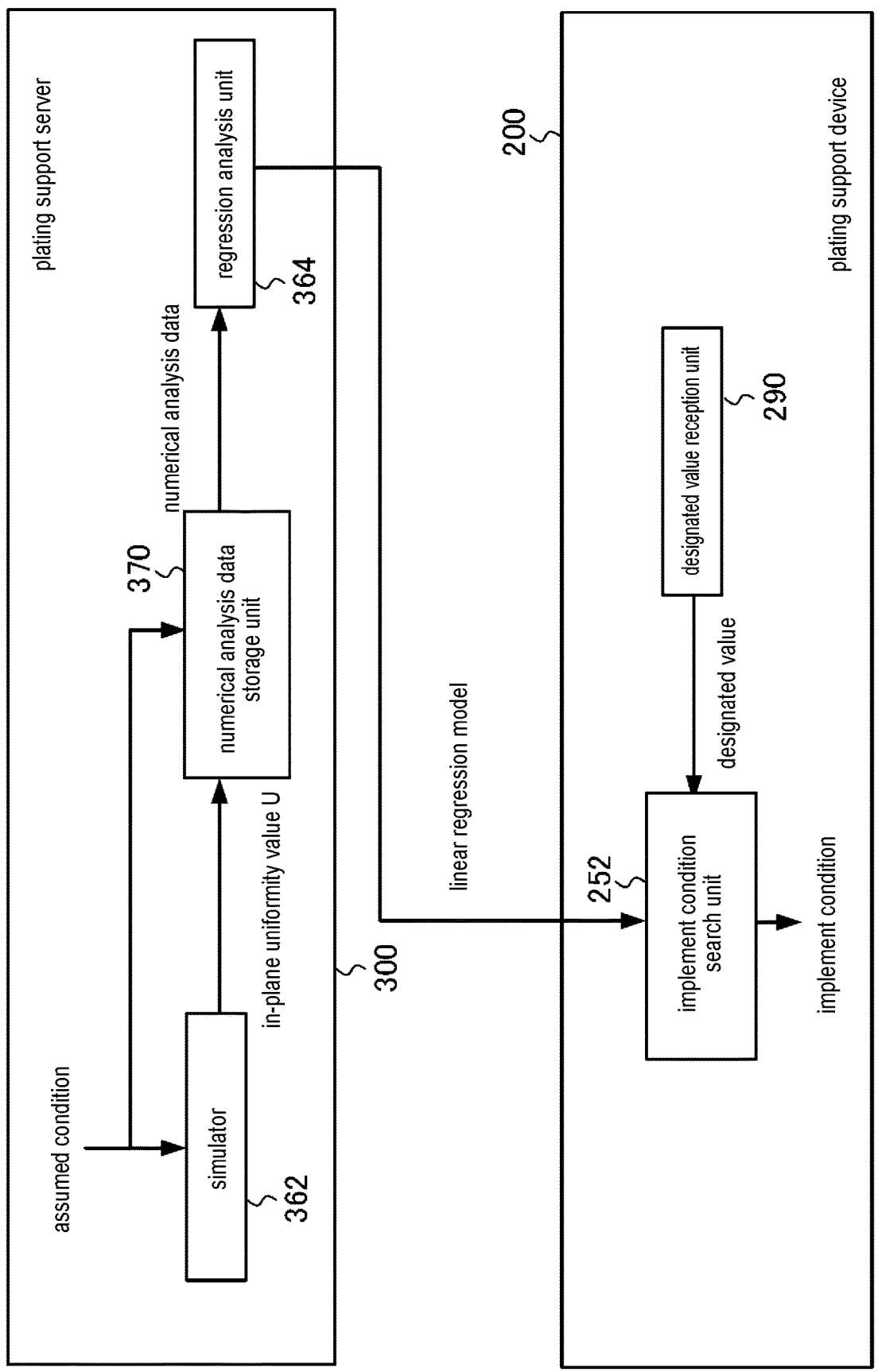
FIG. 19 is a schematic diagram of an overall process in a second embodiment.

FIG. 19 is a schematic diagram of an overall process in the second embodiment.

The plating support server 300 in the second embodiment includes the simulator 362 and the numerical analysis data storage unit 370 in order to perform a process of the preparation phase 412 as in the first embodiment. In addition, the plating support server 300 includes a regression analysis unit 364 in order to perform a process of the model generation phase 414. The regression analysis unit 364 estimates a regression model based on numerical analysis data as in the regression analysis unit 250 described in the first embodiment.

In addition, the data storage unit 308 of the plating support server 300 includes a regression model storage unit (not shown) configured to store a regression model. The reception unit 312 of the plating support server 300 includes a model request reception unit (not shown) configured to receive a model request. The transmission unit 314 of the plating support server 300 includes a model transmission unit (not shown) configured to transmit a linear regression model to the plating support device 200. The linear regression model includes the type of the target variable, the types of explanatory variables, definitions of coefficients and the error term, and the like.

The plating support device 200 in the second embodiment includes the implement condition search unit 252 and the designated value reception unit 290 in order to perform a process of the search phase 416 as in the first embodiment.

In addition, the reception unit 212 of the plating support device 200 includes a model reception unit (not shown) configured to receive a linear regression model from the plating support server 300. The transmission unit 214 of the plating support device 200 includes a model request transmission unit (not shown) configured to transmit a model request to the plating support server 300.

Figure 20:
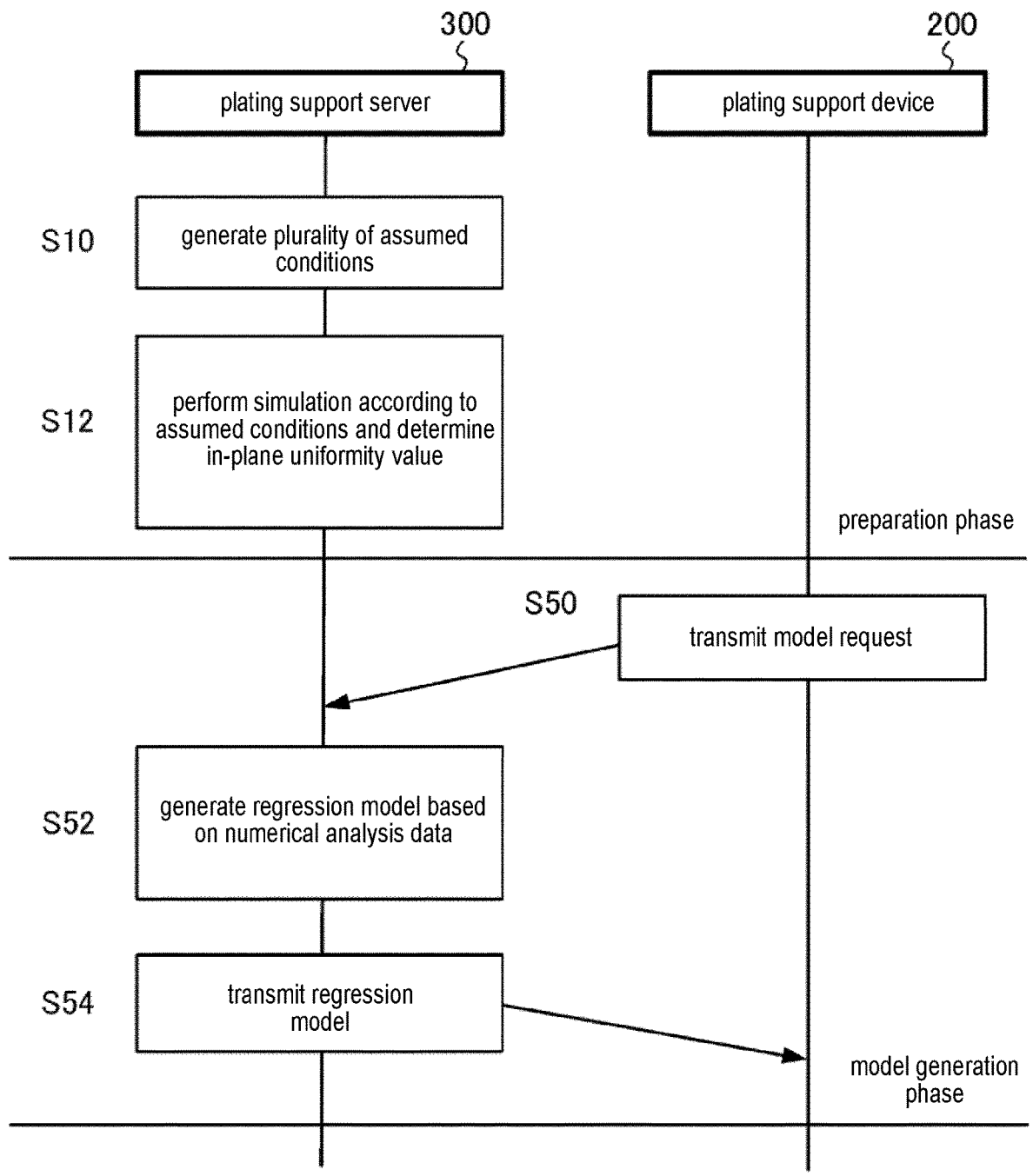
FIG. 20 is a sequence diagram of a preparation phase and a model generation phase in the second embodiment.

FIG. 20 is a sequence diagram of the preparation phase 412 and the model generation phase 414 in the second embodiment.

For the preparation phase 412, a process of the assumed condition generating unit 360 shown in S10 and a process of the simulator 362 shown in S12 are the same as in the first embodiment.

In the model generation phase 414, the model request transmission unit (not shown) of the plating support device 200 transmits a model request to the plating support server 300 (S50).

When the model request reception unit (not shown) of the plating support server 300 receives a model request, the regression analysis unit 364 generates a regression model based on numerical analysis data (S52). The generated regression model is stored in the regression model storage unit (not shown) of the plating support server 300. Then, the model transmission unit (not shown) transmits the regression model to the plating support device 200 (S54).

The regression model received by the model reception unit (not shown) of the plating support device 200 is stored in the regression model storage unit 272.

The sequence of the search phase 416 in the second embodiment is the same as the sequence of the search phase 416 in the first embodiment described with reference to FIG. 16.

In the second embodiment, since the plating support server 300 performs a process of the model generation phase 414, a processing load on the plating support device 200 is reduced.

Modified Example of Second Embodiment

Based on the second embodiment, machine learning may be performed in place of regression analysis, and a learning model may be generated in place of the linear regression model. The plating support server 300 in the modified example of the second embodiment includes a machine learning unit (not shown) in place of the regression analysis unit 364. The plating support device 200 in the modified example of the second embodiment includes a learning model storage unit (not shown) in place of the regression model storage unit 272 and includes a learning model executing unit (not shown) in place of the regression model executing unit 260.

Then, the model transmission unit (not shown) of the plating support server 300 transmits a learning model in place of the linear regression model to the plating support device 200, and the model reception unit (not shown) of the plating support device 200 receives the learning model in place of the linear regression model from the plating support server 300. The received learning model is stored in the learning model storage unit (not shown).

Processes of the machine learning unit (not shown) and the learning model executing unit (not shown) are the same as those in the modified example of the first embodiment.

Third Embodiment

In a third embodiment, an example in which the plating support server 300 performs a process of the preparation phase 412, a process of the model generation phase 414 and a process of the search phase 416 will be described.

Figure 21:
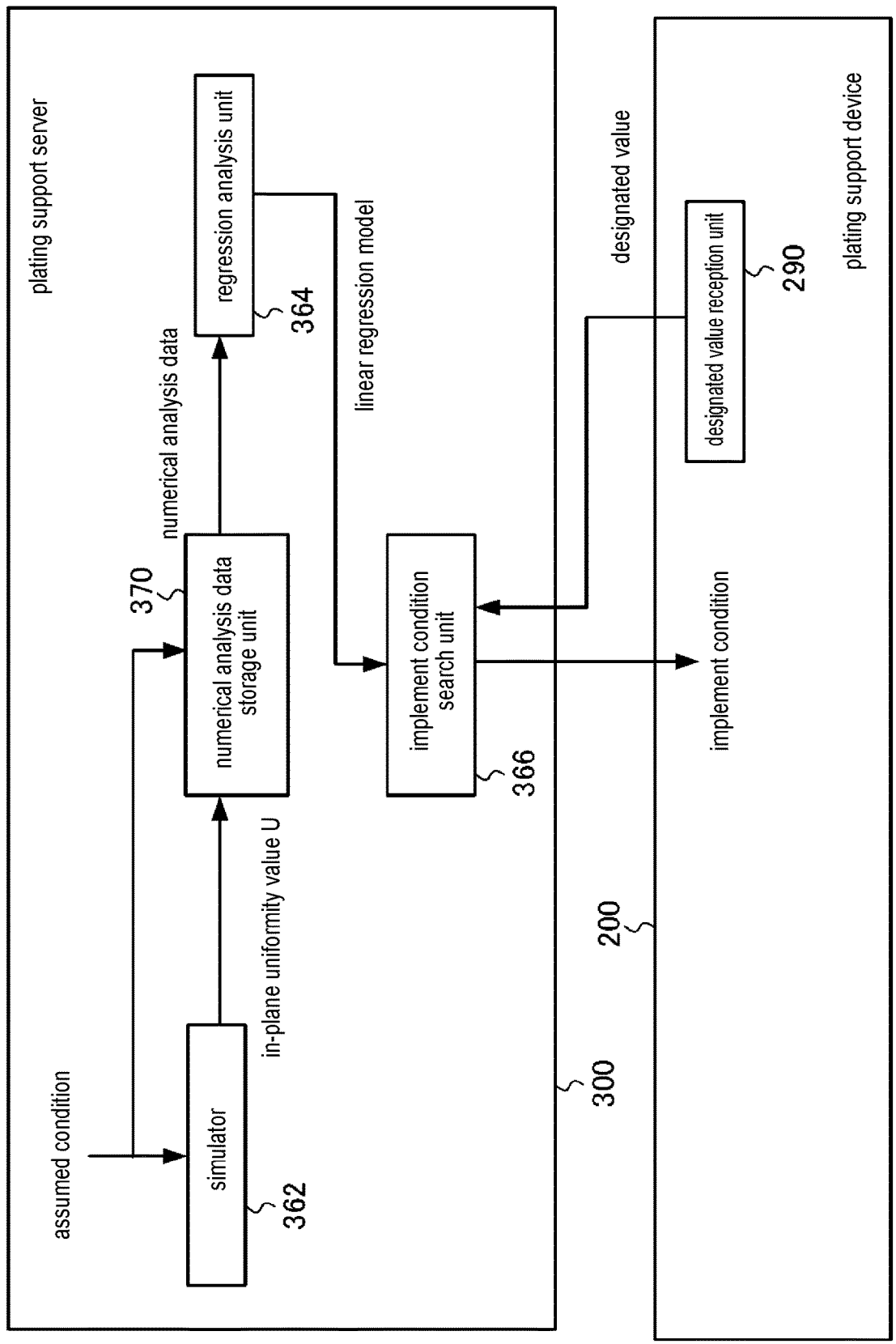
FIG. 21 is a schematic diagram of an overall process in a third embodiment.

FIG. 21 is a schematic diagram of an overall process in the third embodiment.

The plating support server 300 in the third embodiment includes the simulator 362 and the numerical analysis data storage unit 370 in order to perform a process of the preparation phase 412 as in the first embodiment. In addition, the plating support server 300 includes the regression analysis unit 364 in order to perform a process of the model generation phase 414 as in the second embodiment. In addition, the plating support server 300 includes an implement condition search unit 366 in order to perform a process of the search phase 416. The implement condition search unit 366 searches for implement conditions as in the implement condition search unit 252 described in the first embodiment.

In addition, the data processing unit 306 of the plating support server 300 includes the same correlation map creating unit (not shown) as the correlation map creating unit 254, and the same influence degree graph creating unit (not shown) as the influence degree graph creating unit 256. In addition, the data storage unit 308 of the plating support server 300 includes a regression model storage unit (not shown) configured to store a regression model and a search data storage unit (not shown) configured to store search data. In addition, the reception unit 312 of the plating support server 300 includes a designated value reception unit (not shown) configured to receive a designated value from the plating support device 200. The transmission unit 314 of the plating support server 300 includes an implement condition transmission unit (not shown) configured to transmit implement conditions to the plating support device 200, a correlation map transmission unit (not shown) configured to transmit a correlation map to the plating support device 200, and an influence degree graph transmission unit (not shown) configured to transmit an influence degree graph to the plating support device 200.

The plating support device 200 in the third embodiment includes the designated value reception unit 290 as in the first embodiment. In addition, the reception unit 212 of the plating support device 200 includes an implement condition reception unit (not shown) configured to receive implement conditions from the plating support server 300, a correlation map reception unit (not shown) configured to receive a correlation map from the plating support server 300 and an influence degree graph reception unit (not shown) configured to receive an influence degree graph from the plating support server 300. In addition, the transmission unit 214 of the plating support device 200 includes a designated value transmission unit (not shown) configured to transmit a designated value to the plating support server 300.

The sequence of the preparation phase 412 is the same as in the first embodiment. Then, following the preparation phase 412, the process proceeds to a process of the model generation phase 414. The process may proceed to the model generation phase 414 by the model request from the plating support device 200, or may automatically proceed to the model generation phase 414 regardless of the model request from the plating support device 200. In the model generation phase 414, the regression analysis unit 364 generates a regression model based on numerical analysis data. The generated regression model is stored in the regression model storage unit (not shown) of the plating support server 300.

Figure 22:
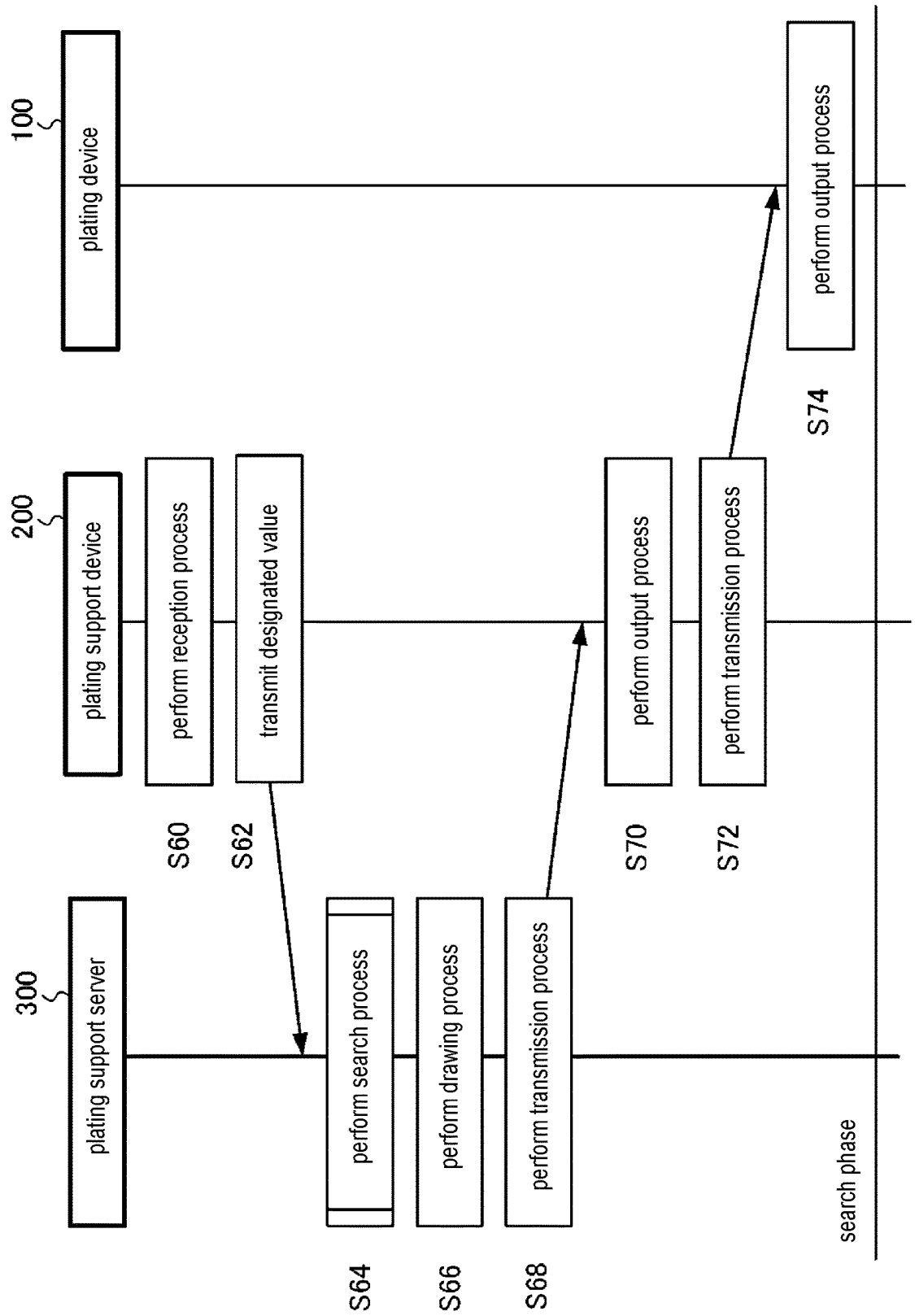
FIG. 22 is a sequence diagram of a search phase in the third embodiment.

FIG. 22 is a sequence diagram of the search phase 416 in the third embodiment.

The input screen output unit 280 and the designated value reception unit 290 of the plating support device 200 perform the above reception process (S60). The designated value transmission unit (not shown) of the plating support device 200 transmits a designated value to the plating support server 300 (S62).

When the designated value reception unit (not shown) of the plating support server 300 receives a designated value, the implement condition search unit 366 performs a search process using the designated value (S64). In this case, search data is stored in the search data storage unit (not shown). The regression model executing unit (not shown) of the implement condition search unit 366 applies search conditions to the linear regression model. In addition, the correlation map creating unit (not shown) creates a correlation map and the influence degree graph creating unit (not shown) creates an influence degree graph. The implement condition transmission unit (not shown) transmits implement conditions to the plating support device 200. The correlation map transmission unit (not shown) transmits a correlation map to the plating support device 200. The influence degree graph transmission unit (not shown) transmits an influence degree graph to the plating support device 200.

The implement condition reception unit (not shown) of the plating support device 200 receives implement conditions from the plating support server 300, the correlation map reception unit (not shown) receives a correlation map from the plating support server 300, and the influence degree graph reception unit (not shown) receives an influence degree graph from the plating support server 300. Then, the plating support device 200 performs an output process (S70), and additionally performs a transmission process (S72) as in the first embodiment. The plating device 100 performs an output process (S74) as in the first embodiment.

In the third embodiment, since the plating support server 300 also performs a process of the search phase 416, a processing load on the plating support device 200 is additionally reduced.

Modified Example of Third Embodiment

Based on the third embodiment, machine learning may be performed in place of regression analysis and a learning model may be generated in place of the linear regression model. The plating support server 300 in the modified example of the third embodiment includes a machine learning unit (not shown) in place of the regression analysis unit 364, includes a learning model storage unit (not shown) in place of the regression model storage unit (not shown), and a learning model executing unit (not shown) in place of the regression model executing unit (not shown).

Processes of the machine learning unit (not shown) and the learning model executing unit (not shown) are the same as those in the modified example of the first embodiment.

Fourth Embodiment

In the fourth embodiment, an example in which the plating support device 200 performs a process of the preparation phase 412, a process of the model generation phase 414 and a process of the search phase 416 will be described.

Figure 23:
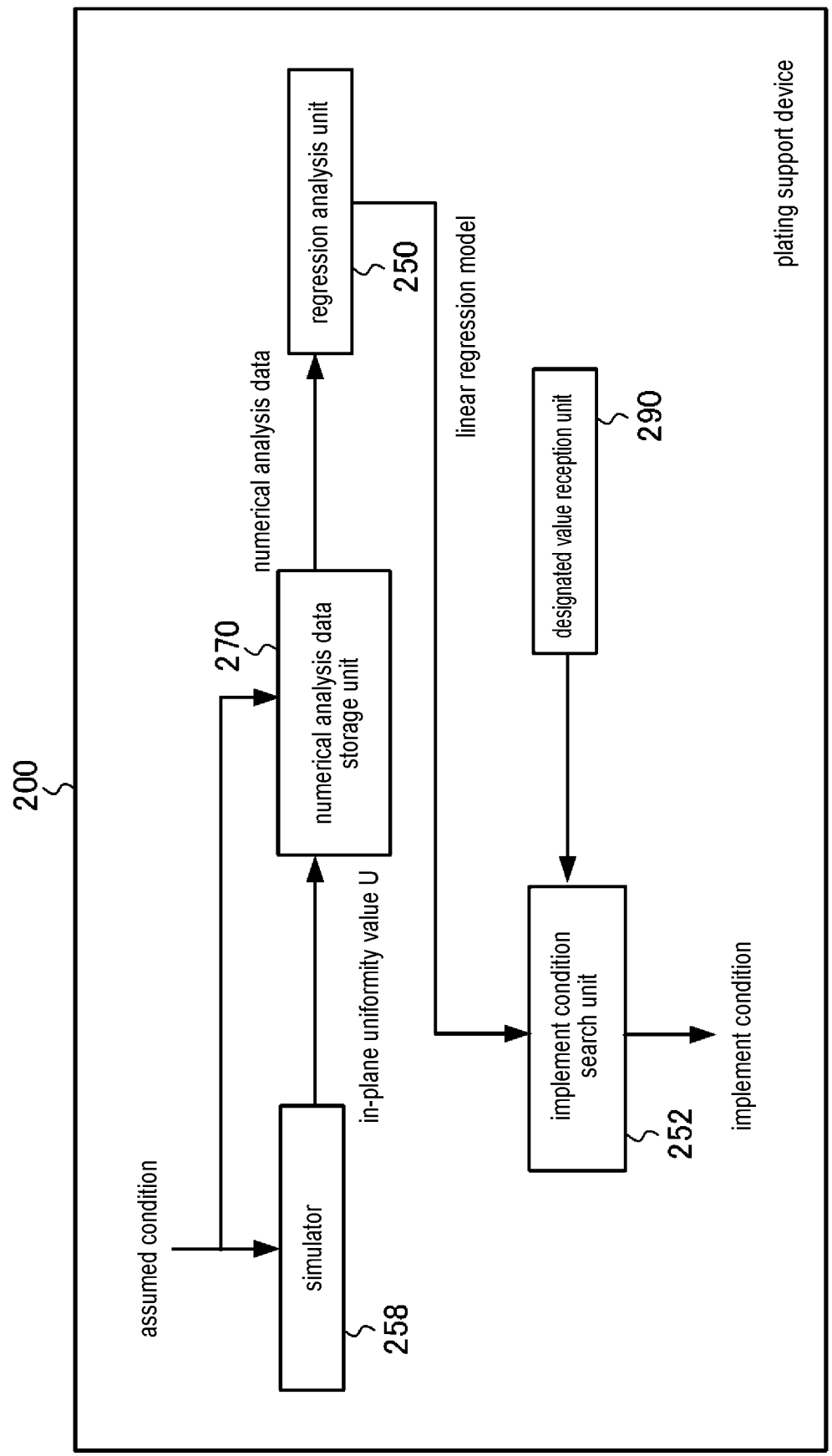
FIG. 23 is a schematic diagram of an overall process in a fourth embodiment.

FIG. 23 is a schematic diagram of an overall process in the fourth embodiment The plating support device 200 in the fourth embodiment includes a simulator 258 and the numerical analysis data storage unit 270 in order to perform a process of the preparation phase 412. In addition, the plating support device 200 includes the regression analysis unit 250 in order to perform a process of the model generation phase 414. In addition, the plating support device 200 includes the implement condition search unit 252 and the designated value reception unit 290 in order to perform a process of the search phase 416.

In addition, the data processing unit 206 of the plating support device 200 includes an assumed condition generating unit (not shown) configured to perform the same process as in the assumed condition generating unit 360.

Figure 24:
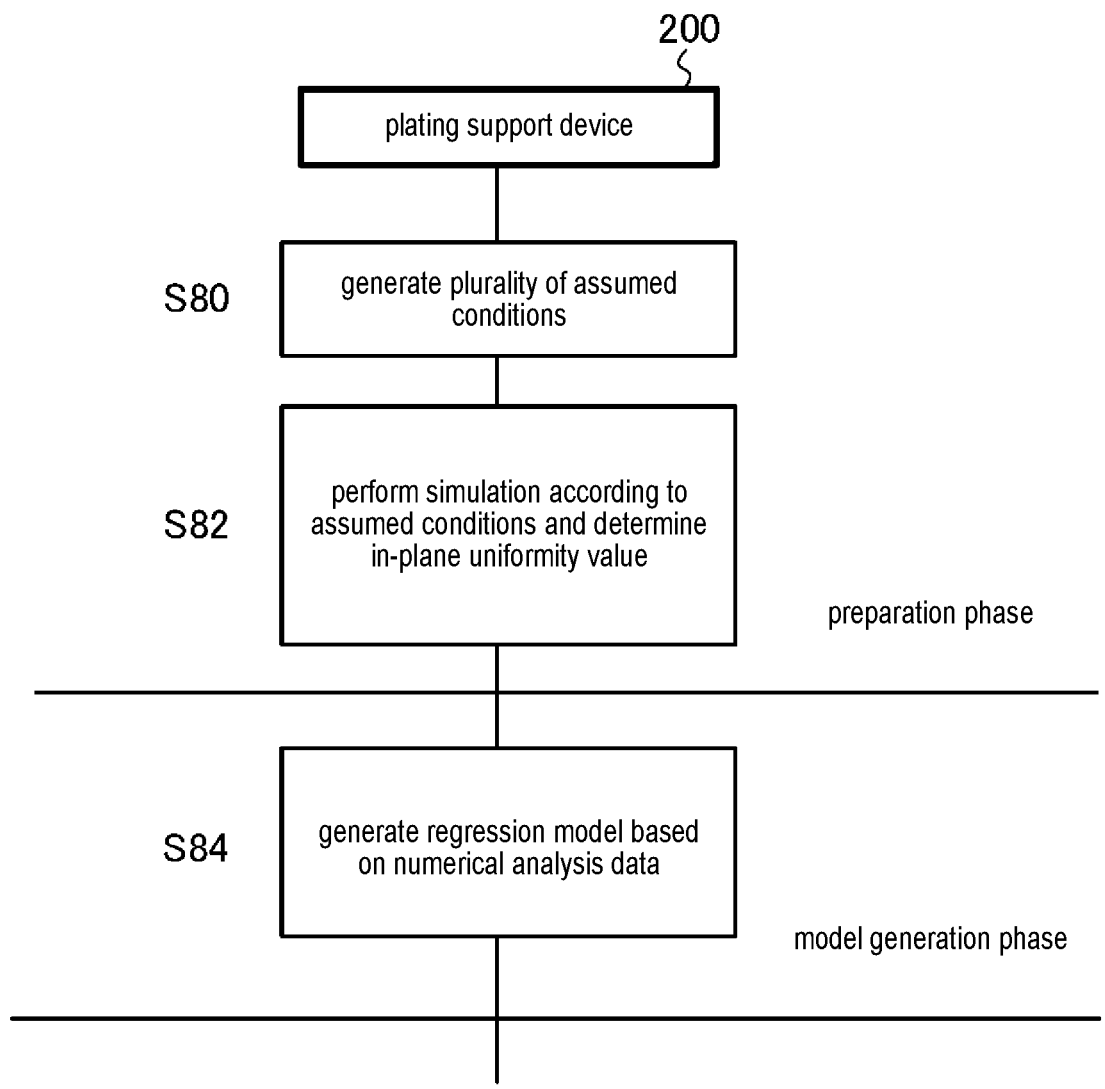
FIG. 24 is a sequence diagram of a preparation phase and a model generation phase in the fourth embodiment.

FIG. 24 is a sequence diagram of the preparation phase 412, the model generation phase 414, and the search phase 416 in the fourth embodiment.

In the preparation phase 412, the assumed condition generating unit (not shown) of the plating support device 200 generates a plurality of assumed conditions (S80). The simulator 258 performs a simulation according to the assumed conditions and determines an in-plane uniformity value (S82).

In the model generation phase 414, the regression analysis unit 250 of the plating support device 200 generates a regression model based on numerical analysis data (S84).

The process of the search phase 416 is the same as in the case of the first embodiment.

In the fourth embodiment, since the plating support server 300 may not be provided, the configuration of the plating support system is simple. In addition, no communication load is generated.

Modified Example of Fourth Embodiment

Based on the fourth embodiment, machine learning may be performed in place of regression analysis, and a learning model may be generated in place of the linear regression model. The plating support device 200 in the modified example of the fourth embodiment includes the machine learning unit (not shown) in place of the regression analysis unit 250, includes the learning model storage unit (not shown) in place of the regression model storage unit 272, and includes the learning model executing unit (not shown) in place of the regression model executing unit 260.

Processes of the machine learning unit (not shown) and the learning model executing unit (not shown) are the same as those in the modified example of the first embodiment.

Other Modified Examples

While an example in which the operator designates values for some variables among the variables for the implement conditions has been described in the above embodiment, the operator need not designate values for any of the variables. In this case, the implement condition search unit 252 sets candidate values for all the variables and combines them to set candidate conditions. Values of all the variables for the recommended implement conditions are displayed on the output screen.

A setting unit configured to set values of variables related to process conditions among values of variables for the implement conditions displayed on the output screen for implement conditions executed by the plating device 100 may be provided in the plating support device 200. That is, the setting unit of the plating support device 200 may automatically set values of variables related to the process conditions in the plating device 100. For example, the average current value Ac_s(A) shown in FIG. 8 may be transmitted from the plating support device 200 to the plating device 100 and the average current value Ac_s(A) may be automatically set for implement conditions of the plating device 100. Accordingly, time and effort for the setup operation are reduced.

Here, non-linear regression analysis will be described. While an example using the linear regression model has been exemplified in the above embodiment, a non-linear regression model may be used. For example, a generalized linear model may be used. The generalized linear model can represent a non-linear relationship between the explanatory variable X and the objective variable Y. In addition, in the error term of the generalized linear model, a distribution other than the normal distribution can be used as a probability distribution.

The generalized linear model uses the following Formula 3.

$$f(Y)=\beta_0+\beta_1 \times X_1+\beta_2 \times X_2+\beta_3 \times X_3+ \ldots +\beta_i \times X_i \beta_{i+1} \times X_1 \times X_2+\beta_{i+2} \times X_1 \times X_3+ \ldots +E \quad \text{[Formula 3]}$$

f(Y) represents a link function. $\beta_{i+1} \times X_1 \times X_2$ and $\beta_{i+2} \times X_1 \times X_3$ represent an interaction term. The interaction term is a term indicating an effect of a combination of variables when the variables affect each other. For example, $\beta_{i+1} \times X_1 \times X_2$ represents an effect of a combination of the variable $X_1$ and the variable $X_2$.

In a first example of the generalized linear model, the link function may be log-linear, and the error distribution may be a Poisson distribution. This is called a Poisson regression model. Similarly, in a second example, the link function may be log-linear and the error distribution may be a gamma distribution. Similarly, in a third example, the link function may be log-linear and the error distribution may be a negative binomial distribution. In addition, logistic regression in which the link function is a logistic function and the error distribution is a binomial distribution or a probit regression in which the link function is a probit function and the error distribution is a binomial distribution may be used. Alternatively, a generalized linear mixed model that is an extension of the generalized linear model may be used.

In addition, a model may be generated using multivariable analysis other than the above regression analysis or machine learning.

In addition, while an example in which predetermined values are assigned to strong acidity, moderate acidity and weak acidity indicating the plating solution type Pd has been described in the above embodiment, a ph value may be used. Alternatively, concentrations of components contained in the plating solution 60 may be used as explanatory variables in place of the plating solution type Pd. For example, the Cu concentration, the $H_2SO_4$ concentration and the chlorine ion concentration may be used as explanatory variables.

In addition, regarding a criterion for selecting explanatory variables, a variable having a strong correlation with the in-plane uniformity value which is the objective variable may be selected. The relationships between variables assumed to be used as explanatory variables and the in-plane uniformity value will be described below.

The relationship between the aperture ratio Wb of the substrate W and the in-plane uniformity will be described. When the aperture ratio Wb is large, that is, when an area of a region to be plated is large, the plating layer grows three-dimensionally. Therefore, a precipitate having a large area is obtained. In addition, as the thickness of the precipitate increases from the order of nm to the order of μm, the intrinsic resistivity becomes lower and the shape approaches the bulk. Due to these factors, the resistance value of the substrate W itself becomes lower than that when there is only a seed layer in the order of nm at the initial stage of plating, and the in-plane uniformity becomes higher as plating precipitation proceeds. On the other hand, when the aperture ratio Wb is small, that is, when an area of a region to be plated is small, since growth in the horizontal direction with respect to the plating layer is restricted, the area of the precipitate becomes small, and the resistance value of the substrate W itself does not change much from the initial stage of plating. If the resistance value of the substrate W itself remains large, the overvoltage at the center of the substrate W becomes large and the overvoltage near a power supply unit becomes lower. In this manner, if the overvoltage difference in the substrate W is large, deviation occurs in formation of the plating and the in-plane uniformity becomes lower.

In addition, not only an area of a region to be plated but also the number of regions to be plated is related to the in-plane uniformity. When regions to be plated are dense, since the ion transfer path between the regions is short and the current density Pc at the interface between the electrode and the plating solution becomes uniform, the in-plane uniformity becomes higher. On the other hand, when regions to be plated are separated, since the ion transfer path between the regions is long and the current density Pc at the interface between the electrode and the plating solution becomes non-uniform, the in-plane uniformity becomes lower.

The relationship between the thickness of the seed layer and the in-plane uniformity will be described. The in-plane uniformity largely depends on the distribution of the thickness of the film formed in the initial stage. The seed layer is generally about 10 to 300 nm, and the intrinsic resistivity changes in such a thin seed layer. Since the intrinsic resistivity is higher as the seed layer is thinner, the difference between the overvoltage at the center of the substrate W and the overvoltage near the power supply unit becomes large in the initial stage of the plating treatment. Therefore, a difference occurs in the film thickness of the plating and the in-plane uniformity becomes lower.

The relationship between the magnitude of the current and the in-plane uniformity will be described. As the current is higher, the difference between the overvoltage near the power supply and the overvoltage at the center of the substrate W increases. Therefore, the in-plane uniformity decrease as the current becomes higher, and the in-plane uniformity becomes higher as the current becomes smaller.

In addition, the temperature of the plating solution may be used as an explanatory variable. The relationship between the temperature of the plating solution 60 and the in-plane uniformity will be described. If the temperature of the plating solution 60 is higher, ions in the plating solution 60 move quickly, and a difference in the ion concentration on the surface of the substrate W is unlikely to occur. Therefore, the overvoltage based on the ion concentration is the same at respective parts and the thickness of the plating film is likely to be uniform. On the other hand, if the temperature of the plating solution 60 is low, ions in the plating solution 60 move slowly, and a difference in the ion concentration on the surface of the substrate W is likely to occur. Therefore, the overvoltage difference becomes large due to the influence of the ion concentration, and the film thickness of the plating becomes non-uniform.

The relationship between the type or characteristic of the plating solution 60 and the in-plane uniformity will be described. The plating solutions 60 having different compositions have different characteristics such as liquid conductivity and viscosity. Conditions for easily improving the in-plane uniformity include low liquid conductivity and low viscosity. If the liquid conductivity is low, the influence of the overvoltage difference on the surface of the substrate W on the in-plane uniformity is weak. In addition, if the viscosity is low, since ions in the plating solution 60 smoothly move, ions are evenly supplied to respective parts, and uneven plating due to the difference in the ion concentration is unlikely to occur. The liquid conductivity and viscosity are examples of characteristic values of the plating solution 60. The liquid conductivity or viscosity may be used as an explanatory variable, and characteristic values other than the liquid conductivity and viscosity may be used as explanatory variables.

The relationship between the anode mask size Ha or the intermediate mask size Hb and the in-plane uniformity will be described. A blocking member such as the anode mask 52 and the intermediate mask 46 influences a primary current density distribution, that is, the ion conductivity path in the plating solution 60. Therefore, the uniformity of the plating film can be adjusted by selecting the anode mask size Ha or the intermediate mask size Hb.

A distance between the substrate W and the anode 62, that is, a distance between electrodes, may be used as an explanatory variable. The relationship between the distance between electrodes and the in-plane uniformity will be described. An appropriate resistance (polarization resistance) of the plating reaction on the surface of the substrate W differs depending on the type of the plating solution 60 and the configuration of the substrate. A change in the distance between electrodes changes the generated voltage and contributes to fine adjustment of the polarization resistance. Therefore, if the distance between electrodes is appropriately selected, a plating layer having high uniformity is easily formed according to the favorable plating reaction.

Figure 25:
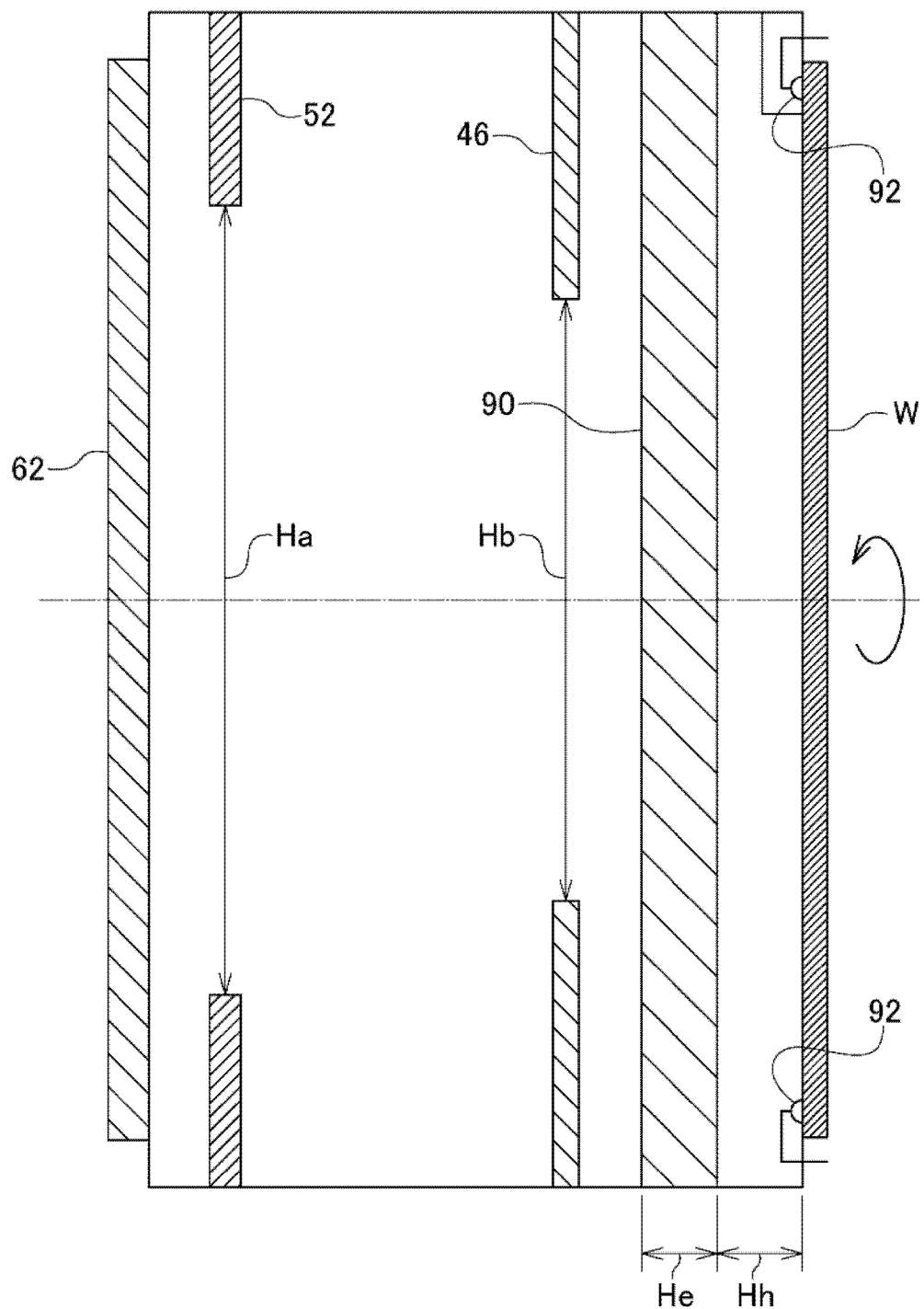
FIG. 25 is a diagram showing a modified example of a plating tank.

FIG. 25 is a diagram showing a modified example of the plating tank 42.

In the plating tank 42 of the modified example, an ion conduction control body 90 is installed between the intermediate mask 46 and the substrate W. The substrate W is provided with electricity through the electrical contacts 95. In addition, a rotation mechanism (not shown) for rotating the substrate W is provided to rotate the substrate W. The vertical axis that passes through the circular center of the substrate W is defined as the central axis of rotation.

Part (a) of FIG. 26 is a perspective view of the ion conduction control body 90. The ion conduction control body 90 has a disk shape. In the ion conduction control body 90, a plurality of pores is formed. The pores have a diameter through which ions can pass. As the ion conduction control body 90, for example, a porous component such as a porous ceramic or mesoporous silica, or a punching plate is used. The ion conduction control body 90 has a function of an electrical resistor. That is, in the modified example of the plating tank 42, there is a resistance member having lower conductivity than the plating solution 60 between the intermediate mask 46 and the substrate W.

Part (b) of FIG. 26 is a cross-sectional view of the ion conduction control body 90 of the porous component.

The pore diameter of the porous component is on the order of several tens of μm or less, and the inside of the porous component has a 3D pore network. In the 3D pore network, ions do not move straightly but move in a curved manner. That is, a course of ion transfer is bent and the movement path is longer than the thickness of the porous component. Therefore, the degree of freedom of ion movement becomes lower and the electrical resistance of the porous component becomes higher.

Part (c) of FIG. 26 is a cross-sectional view of the ion conduction control body 90 of the punching plate.

Columnar holes are formed in the punching plate in the thickness direction. The hole diameter is on the order of mm or more. When the punching plate has been set in the plating tank 42, ions move perpendicular to the substrate W. Therefore, the degree of freedom of ion movement is higher than that of the porous component and the electrical resistance is smaller.

If the ion conduction control body 90 is provided, the ratio of the resistance of the seed layer to the resistance of the entire current path is reduced, the overvoltage difference caused by the resistance difference of the seed layer between near the center and the peripheral part of the substrate W is reduced, and the in-plane uniformity is improved. In addition, since ion movement in the plating solution 60 near the substrate W is restricted, an effect of the current density Pc at the interface of the substrate W becoming uniform is obtained.

In addition, the plating solution 60 is agitated when the substrate W is rotated, and the ion concentration is likely to be uniform.

Similar to rotation of the substrate W, the ion conduction control body 90 may be rotated by the rotation mechanism. In this case also, the plating solution 60 is agitated, and the ion concentration is likely to be uniform.

When the plating device 100 including the plating tank 42 of the above modified example is used, a distance Hh between an ion conductive control body 90 and the substrate W may be used as an explanatory variable. The distance between the ion conductive control body 90 and the substrate W is related to the distribution of the ion concentration and influences the in-plane uniformity.

In addition, the porosity of the ion conduction control body 90 may be used as an explanatory variable. The porosity of the ion conductive control body 90 is related to the magnitude of resistance and influences the in-plane uniformity.

In addition, the thickness He of the ion conduction control body 90 may be used as an explanatory variable. The thickness of the ion conductive control body 90 is related to the magnitude of resistance and influences the in-plane uniformity.

In addition, the type of the ion conductive control body 90 may be used as an explanatory variable. The type of the ion conductive control body 90 is related to the magnitude of resistance and influences the in-plane uniformity.

In addition, in addition to the porous component and the punching plate, a member in which a space blocked by an ion exchange membrane is filled with an electrical liquid having lower conductivity than the plating solution 60 may be installed as the ion conduction control body 90. In this case, the conductivity of the electrical liquid may be used as an explanatory variable. The type of the ion conductive control body 90 is related to the magnitude of resistance and influences the in-plane uniformity.

In addition, the rotational speed of the substrate W may be used as an explanatory variable. In addition, the rotational speed of the ion conduction control body 90 may be used as an explanatory variable.

In addition, a variable that is not the original explanatory variable may be added as an explanatory variable according to Bayesian estimation. When the Bayesian estimation is performed, a new explanatory variable is added to a condition, the in-plane uniformity value in the condition is actually measured, or predicted data is used. A method of modifying the regression model by the Bayesian estimation is based on the related art.

In addition, the in-plane uniformity value calculated by the regression model for certain candidate conditions may be added to numerical analysis data.

In addition, the implement conditions may include all the explanatory variables of the regression model or the learning model or some of the explanatory variables. That is, the regression model or the learning model may include variables that do not correspond to the implement conditions as explanatory variables.

In addition, regression analysis or machine learning may be performed using actual data obtained by the experiment rather than numerical analysis data. Regression analysis or machine learning may be performed using both numerical analysis data and actual data.

In addition, a semiconductor wafer may be square. In this case, the opening hole of the anode mask 52 and the opening hole of the intermediate mask 46 may be square.

It is not necessary to say that, while preferable embodiments of the disclosure have been described above, the disclosure is not limited to the specific embodiments, and various modifications can be made without departing from the spirit and scope of the disclosure.

Here, the disclosure is not limited to the above embodiments and modified examples, and components can be modified and embodied without departing from the gist. A plurality of components disclosed in the above embodiments and modified examples may be appropriately combined to form various inventions. In addition, some components may be deleted from all components shown in the above embodiments and modified examples.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A plating support system, comprising:
a plating device, performing a plating process to a wafer;
a plating support server; and
a plating support device, coupled to the plating device through an internal network and coupled to the plating support server through an external network,
wherein the plating support server comprises:
a server processor, configured to generate a plurality of assumed conditions for an electroplating treatment of the substrate and perform a function of a simulator that predicts an in-plane uniformity value of a plating film formed on a substrate based on the plurality of assumed conditions; and
a memory that stores numerical analysis data in which for the assumed conditions, the in-plane uniformity value predicted by the simulator is associated with values of plural variables that specify each of the assumed conditions,
wherein the plating support device, having a processor and configured to perform:
a request that the plating support device is configured to transmit a data request for the numerical analysis data to the plating support server;
a reception that the plating support device is configured to receive the numerical analysis data from the plating support server in response to that plating support server receives the data request;
an analysis that estimates a regression model in which the in-plane uniformity value is used as an objective variable and the plural variables are used as explanatory variables by regression analysis based on the numerical analysis data; and
a search that uses the estimated regression model to search for implement conditions that are recommended values of the assumed conditions related to an in-plane uniformity of the plating film formed in the electroplating treatment of the substrate to be plated.

2. The plating support system according to claim 1, wherein the implement conditions include values of any of the plural variables.

3. The plating support system according to claim 1, wherein the processor of the plating support device is further configured to perform
a designation that when the implement conditions include values of two or more variables, designates values of a portion of variables among the two or more variables, wherein the search searches for the implement conditions by applying the designated values of the portion of the variables.

4. The plating support system according to claim 3, wherein the search specifies the implement conditions in which the in-plane uniformity value satisfies a predetermined condition among a plurality of conditions that are able to be implemented in the electroplating treatment of the substrate to be plated.

5. The plating support system according to claim 1, wherein each of the assumed conditions relates to at least any of a configuration of the substrate, a configuration of a plating device and controls of the electroplating treatment.

6. The plating support system according to claim 1, wherein one of the plural variables as the explanatory variable is an aperture ratio of the substrate or a thickness of a seed layer of the substrate.

7. The plating support system according to claim 1, wherein one of the plural variables as the explanatory variable is a rotational speed of the substrate.

8. The plating support system according to claim 1, wherein one of the plural variables as the explanatory variable is related to a magnitude of a current in the electroplating treatment.

9. The plating support system according to claim 1, wherein one of the plural variables as the explanatory variable is a time for the electroplating treatment or a thickness of the plating film.

10. The plating support system according to claim 1, wherein one of the plural variables as the explanatory variable is related to a temperature, a type or a characteristic of a plating solution used in the electroplating treatment.

11. The plating support system according to claim 1, wherein one of the plural variables as the explanatory variable is related to a shape of an electric field blocking member provided in a plating tank of a plating device.

12. The plating support system according to claim 1, wherein one of the plural variables as the explanatory variable is a porosity of a plate having a function of controlling ion conductivity provided in a plating tank of a plating device, a thickness of an ion conduction control body provided in the plating tank, a rotational speed of the ion conduction control body, or a distance between the ion conduction control body and the substrate.

13. The plating support system according to claim 1, wherein one of the plural variables as the explanatory variable is a distance between electrodes in a plating device.

14. The plating support system according to claim 1, wherein the processor of the plating support device is further configured to perform
a condition output that outputs the implement conditions.

15. The plating support system according to claim 1, wherein the processor of the plating support device is further configured to perform
a graph output which outputs a graph that with respect to a plurality of conditions that are able to be implemented for the electroplating treatment of the substrate to be plated, collectively represents a relationship between values of two or more variables included in each of the plurality of conditions and the in-plane uniformity value.

16. A plating support system, comprising:
a plating device, performing a plating process to a wafer;
a plating support server; and
a plating support device, coupled to the plating device through a network and coupled to the plating support server through an external network,
wherein the plating support server comprises:
a server processor, configured to generate a plurality of assumed conditions for an electroplating treatment of the substrate and perform a function of a simulator that predicts an in-plane uniformity value of a plating film formed on a substrate based on the plurality of assumed conditions; and
a memory that stores numerical analysis data in which for the assumed conditions, the in-plane uniformity value predicted by the simulator is associated with values of plural variables that specify each of the assumed conditions,
wherein the plating support device, having a processor and configured to perform:
a request that the plating support device is configured to transmit a data request for the numerical analysis data to the plating support server;
a reception that the plating support device is configured to receive the numerical analysis data from the plating support server in response to that plating support server receives the data request;
a learning that generates a regression model in which the in-plane uniformity value is used as an objective variable and the plural variables are used as explanatory variables by machine learning based on the numerical analysis data; and
a search that uses the generated regression model to search for implement conditions that are recommended values of the assumed conditions related to an in-plane uniformity of the plating film formed in the electroplating treatment of the substrate to be plated.

17. The plating support system according to claim 16, wherein the implement conditions include values of any of the plural variables.

18. The plating support system according to claim 17, wherein the processor of the plating support device is further configured to perform
a designation that when the implement conditions include values of two or more variables, designates values of a portion of variables among the two or more variables,
wherein the search searches for the implement conditions by applying the designated values of the portion of the variables.

19. The plating support system according to claim 16, wherein the search specifies the implement conditions in which the in-plane uniformity value satisfies a predetermined condition among a plurality of conditions that are able to be implemented in the electroplating treatment of the substrate to be plated.

20. The plating support system according to claim 16, wherein each of the assumed conditions relates to at least any of a configuration of the substrate, a configuration of a plating device and controls of the electroplating treatment.

21. The plating support system according to claim 16, wherein one of the plural variables as the explanatory variable is an aperture ratio of the substrate or a thickness of a seed layer of the substrate.

22. The plating support system according to claim 16, wherein one of the plural variables as the explanatory variable is a rotational speed of the substrate.

23. The plating support system according to claim 16, wherein one of the plural variables as the explanatory variable is related to a magnitude of a current in the electroplating treatment.

24. The plating support system according to claim 16, wherein one of the plural variables as the explanatory variable is a time for the electroplating treatment or a thickness of the plating film.

25. The plating support system according to claim 16, wherein one of the plural variables as the explanatory variable is related to a temperature, a type or a characteristic of a plating solution used in the electroplating treatment.

26. The plating support system according to claim 16, wherein one of the plural variables as the explanatory variable is related to a shape of an electric field blocking member provided in a plating tank of a plating device.

27. The plating support system according to claim 16, wherein one of the plural variables as the explanatory variable is a porosity of a plate having a function of controlling ion conductivity provided in a plating tank of a plating device, a thickness of an ion conduction control body provided in the plating tank, a rotational speed of the ion conduction control body, or a distance between the ion conduction control body and the substrate.

28. The plating support system according to claim 16, wherein one of the plural variables as the explanatory variable is a distance between electrodes in a plating device.

29. The plating support system according to claim 16, wherein the processor of the plating support device is further configured to perform
a condition output that outputs the implement conditions.

30. The plating support system according to claim 16, wherein the processor of the plating support device is further configured to perform
a graph output which outputs a graph that with respect to a plurality of conditions that are able to be implemented for the electroplating treatment of the substrate to be plated, collectively represents a relationship between values of two or more variables included in each of the plurality of conditions and the in-plane uniformity value.

31. A non-transitory computer-readable recording medium, storing a plating support program that causes a processor of a computer serving as a plating support device to execute:
a function of request to transmit a data request for numerical analysis data to a plating support server coupled to the plating support device through an external network, wherein the plating support server comprises: a server processor, configured to generate a plurality of assumed conditions for an electroplating treatment of the substrate and perform a function of a simulator that predicts an in-plane uniformity value of a plating film formed on a substrate based on the plurality of assumed conditions; and a memory that stores numerical analysis data in which for the assumed conditions, the in-plane uniformity value predicted by the simulator is associated with values of plural variables that specify each of the assumed conditions;
a function of reception to receive the numerical analysis data from the plating support server in response to that plating support server receives the data request;

a function of estimating a regression model in which an in-plane uniformity value is used as an objective variable and plural variables are used as explanatory variables by regression analysis based on the numerical analysis data;

a function of using the estimated regression model to search for implement conditions that are recommended values of the assumed conditions related to an in-plane uniformity of the plating film formed in the electroplating treatment of the substrate to be plated; and a transmission of providing the implement conditions to a plating device to perform a plating process to a wafer, wherein the plating device is coupled to the plating support device through an internal network.

32. A non-transitory computer-readable recording medium, storing a plating support program that causes a processor of a computer serving as a plating support device to execute:

a function of request to transmit a data request for numerical analysis data to a plating support server coupled to the plating support device through an external network, wherein the plating support server comprises: a server processor, configured to generate a plurality of assumed conditions for an electroplating treatment of the substrate and perform a function of a simulator that predicts an in-plane uniformity value of a plating film formed on a substrate based on the plurality of assumed conditions; and a memory that stores numerical analysis data in which for the assumed conditions, the in-plane uniformity value predicted by the simulator is associated with values of plural variables that specify each of the assumed conditions;

a function of reception to receive the numerical analysis data from the plating support server in response to that plating support server receives the data request;

a function of generating a regression model in which an in-plane uniformity value is used as an objective variable and plural variables are used as explanatory variables by machine learning based on the numerical analysis data;

a function of using the generated regression model to search for implement conditions that are recommended values of the assumed conditions related to the in-plane uniformity of the plating film formed in the electroplating treatment of the substrate to be plated; and a transmission of providing the implement conditions to a plating device to perform a plating process to a wafer, wherein the plating device is coupled to the plating support device through an internal network.

33. A plating support device, comprising:

a wired or wireless communication lines coupled to a plating support server through an external network; and a processor, configured to perform:

a request that the plating support device is configured to transmit a data request for numerical analysis data to the plating support server, wherein the plating support server comprises: a server processor, configured to generate a plurality of assumed conditions for an electroplating treatment of the substrate and perform a function of a simulator that predicts an in-plane uniformity value of a plating film formed on a substrate based on the plurality of assumed conditions; and a memory that stores numerical analysis data in which for the assumed conditions, the in-plane uniformity value predicted by the simulator is associated with values of plural variables that specify each of the assumed conditions;

a reception that the plating support device is configured to receive the numerical analysis data from the plating support server in response to that plating support server receives the data request;

an analysis that estimates a regression model in which an in-plane uniformity value is used as an objective variable and plural variables are used as explanatory variables by regression analysis based on the numerical analysis data; and a search that uses the estimated regression model to search for implement conditions that are recommended values of the assumed conditions related to an in-plane uniformity of the plating film formed in the electroplating treatment of the substrate to be plated, wherein the plating support device is configured to provide the implement conditions to a plating device to perform a plating process to a wafer, wherein the plating device is coupled to the plating support device through an internal network.

34. A plating support device, comprising:

a wired or wireless communication lines coupled to a plating support server through an external network; and a processor, configured to perform:

a request that the plating support device is configured to transmit a data request for numerical analysis data to the plating support server, wherein the plating support server comprises: a server processor, configured to generate a plurality of assumed conditions for an electroplating treatment of the substrate and perform a function of a simulator that predicts an in-plane uniformity value of a plating film formed on a substrate based on the plurality of assumed conditions; and a memory that stores numerical analysis data in which for the assumed conditions, the in-plane uniformity value predicted by the simulator is associated with values of plural variables that specify each of the assumed conditions;

a reception that the plating support device is configured to receive the numerical analysis data from the plating support server in response to that plating support server receives the data request;

a learning that generates a regression model in which an in-plane uniformity value is used as an objective variable and plural variables are used as explanatory variables by machine learning based on the numerical analysis data; and a search that uses the generated regression model to search for implement conditions that are recommended values of the assumed conditions related to the in-plane uniformity of the plating film formed in the electroplating treatment of the substrate to be plated, wherein the plating support device is configured to provide the implement conditions to a plating device to perform a plating process to a wafer, wherein the plating device is coupled to the plating support device through an internal network.

* * * * *